United States Patent
Ochs et al.

(10) Patent No.: US 12,172,791 B2
(45) Date of Patent: Dec. 24, 2024

(54) SYSTEMS AND METHODS FOR LONGITUDINAL SCORING OF ROLL-FORMED CONTAINERS

(71) Applicant: Amazon Technologies, Inc., Seattle, WA (US)

(72) Inventors: Garett Ochs, Seattle, WA (US); Terin Thomas, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 17/932,541

(22) Filed: Sep. 15, 2022

(65) Prior Publication Data

US 2024/0092520 A1    Mar. 21, 2024

(51) Int. Cl.
| | |
|---|---|
| B31B 50/25 | (2017.01) |
| B65B 5/02 | (2006.01) |
| B65B 35/24 | (2006.01) |
| B65B 41/16 | (2006.01) |
| B65B 43/10 | (2006.01) |
| B65B 61/02 | (2006.01) |
| B65D 5/06 | (2006.01) |
| B65D 5/42 | (2006.01) |

(52) U.S. Cl.
CPC ............. B65B 61/02 (2013.01); B65B 5/024 (2013.01); B65B 35/24 (2013.01); B65B 41/16 (2013.01); B65B 43/10 (2013.01); B65D 5/06 (2013.01); B65D 5/4266 (2013.01)

(58) Field of Classification Search
USPC ......................................................... 53/217
See application file for complete search history.

(56) References Cited

U.S. PATENT DOCUMENTS

| | | | | |
|---|---|---|---|---|
| 4,715,847 | A * | 12/1987 | Focke | B26F 1/384 83/100 |
| 2011/0283855 | A1* | 11/2011 | Kwarta | B26D 7/2635 83/499 |
| 2012/0115699 | A1* | 5/2012 | Capoia | B31F 1/10 493/324 |
| 2015/0018189 | A1* | 1/2015 | Pettersson | B26D 1/18 493/395 |
| 2016/0185065 | A1* | 6/2016 | Sytema | B31B 50/52 493/183 |
| 2019/0308383 | A1* | 10/2019 | Provoost | B31B 50/006 |
| 2020/0031083 | A1* | 1/2020 | Ponti | B31B 50/20 |
| 2020/0101686 | A1* | 4/2020 | Fredander | B26D 11/00 |

* cited by examiner

Primary Examiner — Chinyere J Rushing-Tucker
(74) Attorney, Agent, or Firm — Eversheds Sutherland (US) LLP

(57) ABSTRACT

Systems and methods are disclosed for longitudinal scoring of roll-formed containers. In one embodiment, an example system may include a first scoring device having a first rolling die, a first arm coupled to the first rolling die, a second rolling die, a second arm coupled to the second rolling die, and a first support member configured to support the first arm and the second arm. The first arm and the second arm may be configured to: (i) slide along the first support member, such that a distance between the first rolling die and the second rolling die is adjusted, and (ii) rotate about the first support member from a first position to a second position, such that the first rolling die and the second rolling die move from the first position to the second position. The first scoring device may score ends of the packaging material.

15 Claims, 17 Drawing Sheets

SYSTEMS AND METHODS FOR LONGITUDINAL SCORING OF ROLL-FORMED CONTAINERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks. Moreover, in some instances, single items may be packed in containers for shipment. However, such items may be of different shapes and sizes. Accordingly, custom sized containers for shipping may be desired.

Figure 1:
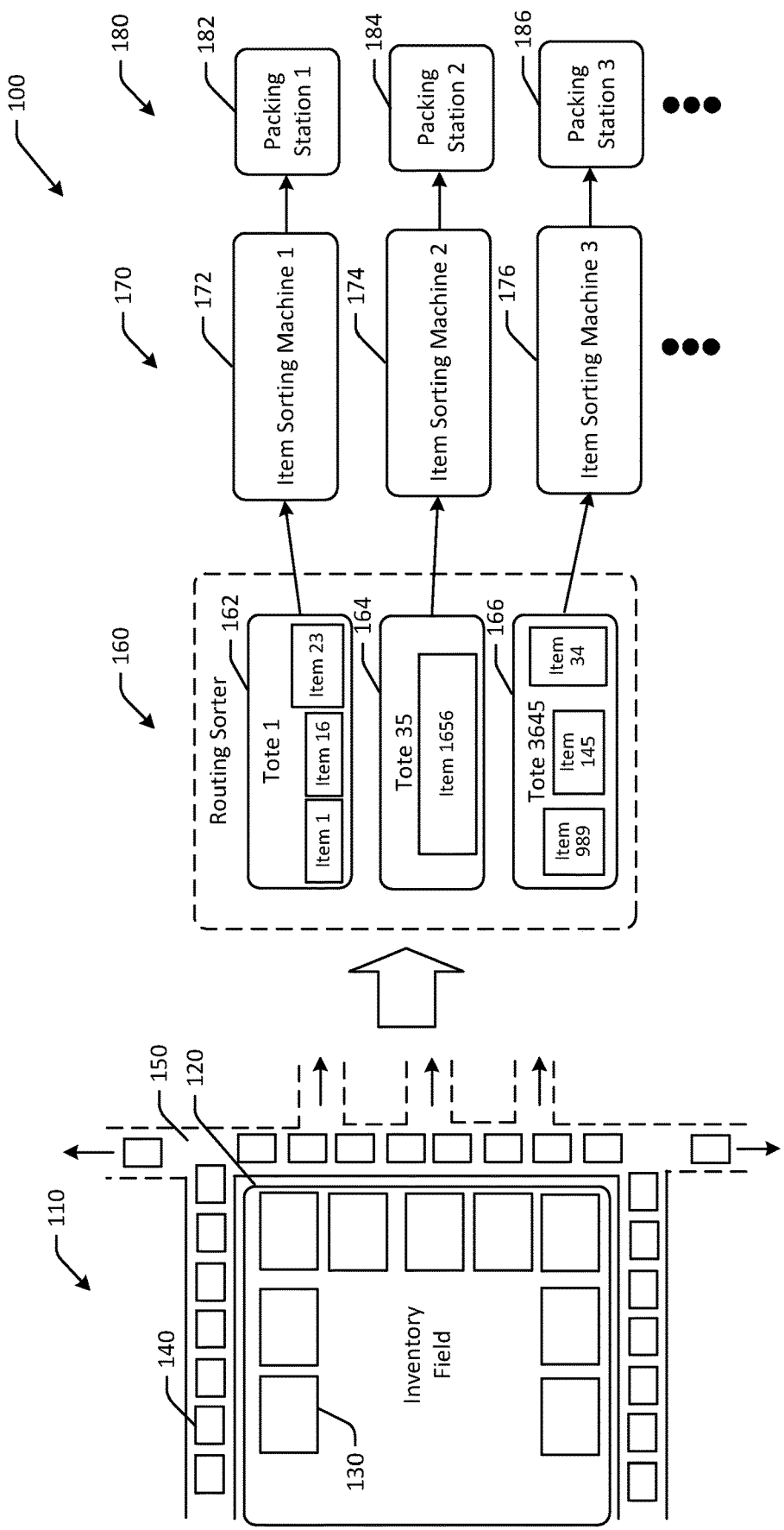
FIG. 1 is a hybrid schematic illustration of an example use case for roll-formed containers for shipping and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. In addition, a number of different types of containers may be used to pack items into for shipping. For example, container types may include boxes, bags, flexible containers (e.g., paper mailers, bubble wrap mailers, etc.) and/or other types of containers. Some containers may be have fixed sizes or dimensions, and may therefore be larger than an item that is packed inside, resulting in the use of bubbles, packing paper, or other fillers to reduce a likelihood of damage to the item during transit. In addition, certain containers may be formed of non-recyclable materials, such as certain types of plastic. Accordingly, custom sized or right-sized containers that are made of recyclable may be desired so as to not only reduce environmental impact, but also to reduce waste and packaging material consumption due to custom sized containers for items, thereby removing the need for fillers and avoiding containers that are too big relative to the size of the item(s) in the container.

Embodiments of the disclosure include methods and systems for roll-formed containers for shipping that may improve packing quality (e.g., items may not move within the container as the container is custom sized around the item, etc.), and reduce environmental impact by providing a recyclable package that can be recycled after delivery. Some embodiments may produce roll-formed containers to ship items without waste or scrap, providing environmental benefits. Certain embodiments include custom container formation equipment that can be used to produce containers that are sized based at least in part on dimensions of an item to be packed inside the container. The containers may be formed of a single sheet of roll-formed material, such as a fiber-based material, at least partially fiber-based material, a paper-based material (e.g., unpadded cardboard, single-sided or double-sided corrugate, a non-Gaussian material, etc.) that is formed around the item to be packed. The item may be placed onto a portion of the recyclable material and the container may be formed using one or more rollers and folders that can be used to form a number of different container configurations, including configurations with inward-facing gussets, outward-facing gussets, bent sidewalls, round sidewalls, flat sidewalls, and so forth, along with different types of seals. Containers may be output at a rate of up to or greater than 2,000 units per hour. Some embodiments include camera assemblies or other sensor assemblies that can be used to determine item dimensions and placement. To facilitate scalability, certain embodiments may produce a number of containers at substantially the same time, or during an overlapping timeframe, as discussed with respect to FIG. 2. Some embodiments include optimized process flows for processing of orders at fulfillment centers, as well as process flows or methods to increase speed of consolidating products in a single-item or multi-item order as a result of improved speed in placing items into containers and removing items from containers. As a result, throughput of fulfillment centers may be improved, and/or logistics of fulfillment center operations may be less complicated.

Some embodiments may include systems and methods for continuous roll-forming and filling of custom sized packages using recyclable or non-recyclable packaging material. Some embodiments may be formed of materials such as sheets or other continuous spans of material. Materials may include laminated materials, thermal transitioning materials (e.g., materials that change various properties when heated, etc.), plastic materials, polymer materials, paper-based materials, composite materials, and/or other materials that may be roll-fed into a system. Certain embodiments include dynamically indexable and/or repositionable rolling dies, which may optionally be cylindrical or barrel-shaped, to crease, perforate, and/or score a Y-shaped or crow's foot type of pattern at edges or ends of the packaging material. Other embodiments may have different crease patterns, such as triangular or diamond patterns, and/or may have repeated patterns along a length of the material. A height to width ratio of the crease patterns (or any other suitable geometry pattern, including linear patterns, circular patterns, oval patterns, etc.) may also be dynamically indexable and/or adjustable to further define the fully formed dimensions of the package.

Embodiments may therefore produce roll-formed containers without creating scrap material, and with high accuracy and precision, so as to form a custom fit package for an item inside. Throughput of roll-formed containers may be increased as a result of simplified design and process. For example, adhesive may be applied while packaging material and items remain in motion, and splicing of packaging material rolls may be automated to reduce downtime.

As a result of the improve functionality provided by the systems and methods described herein, flexibility of the processing of items at the fulfillment center may be increased, such as by providing the ability to create roll-formed containers for thin items, such as children's books, without having to replace rolling dies with those of different widths. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for roll-formed containers for shipping and an example process flow is depicted in accordance with one or more embodiments of the disclosure. Although discussed in the context of online orders, other embodiments may be directed to any suitable use case where objects are packed into containers, such as instances where items for single item orders that are picked from inventory and placed into flexible containers for shipment, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a single-item or multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

Some of the packing stations may be configured to pack items for single-item orders into containers for shipment, such as custom-sized roll-formed containers, instead of pre-sized containers with fixed dimensions. In one example embodiments, container systems as described herein may be packing stations for single items orders, such that single items are placed into custom sized roll-formed containers and transported downstream for shipment.

At any of the stages of the example fulfillment process of FIG. 1 where handling of objects is used, such as to pick items from inventory, place items in totes, remove items from totes, place items into bins, remove items from bins, place items into boxes for shipping, and so forth, robotic manipulators may be used. As a result, manual effort can be redirected to other tasks.

Embodiments of the disclosure include roll-formed containers for shipping. Certain embodiments may reduce waste and improve shipment quality by providing custom sized containers, and may improve processing speed and/or throughput of fulfillment centers. Certain embodiments may improve performance of mechanical equipment for packing, sortation, and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve packing quality, reduce a likelihood of item or container damage, and improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
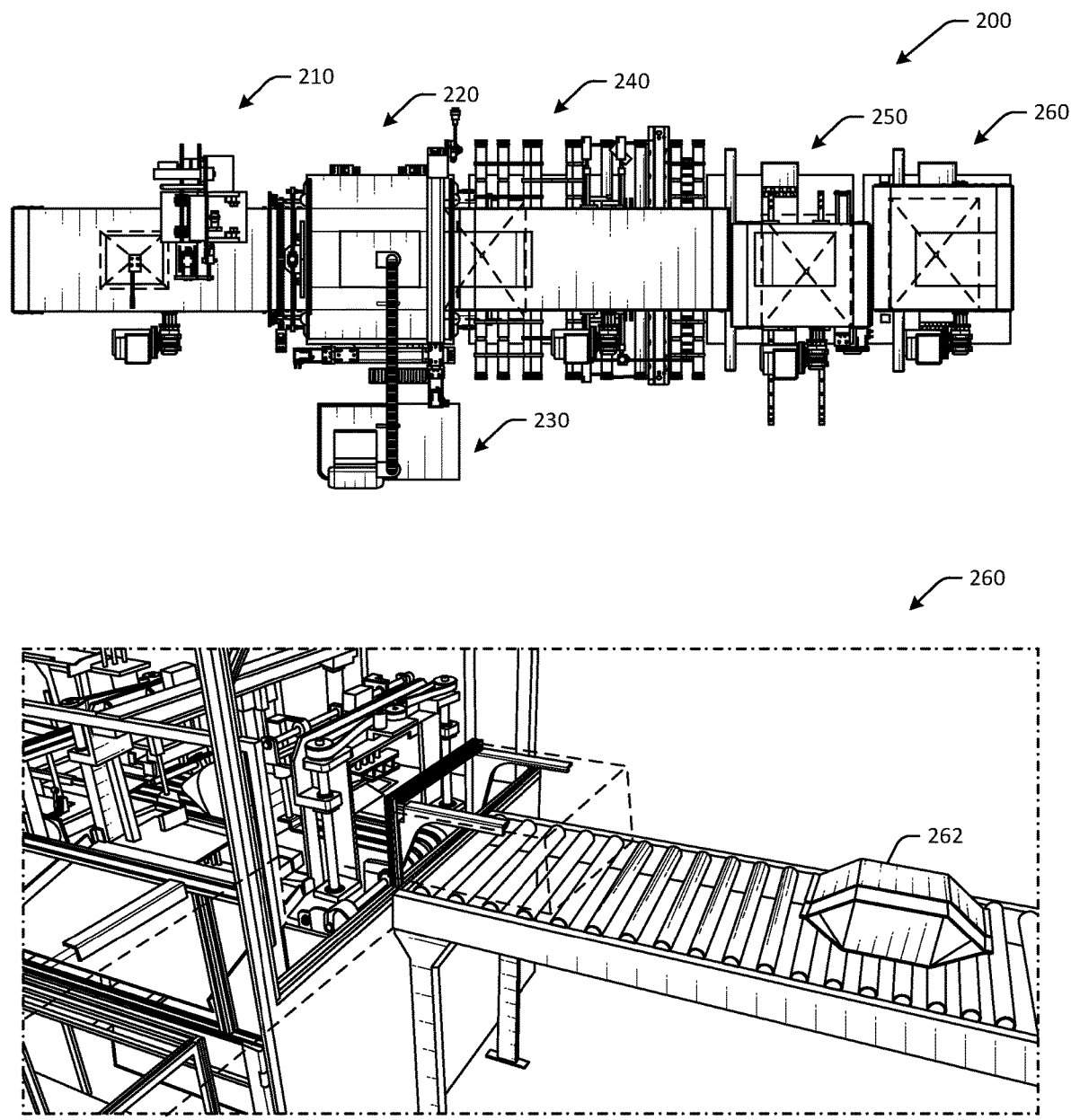
FIGS. 2A-2B are schematic illustrations of an example roll-formed container generation system and an example roll-formed container in various views in accordance with one or more embodiments of the disclosure.
Figure 2B:
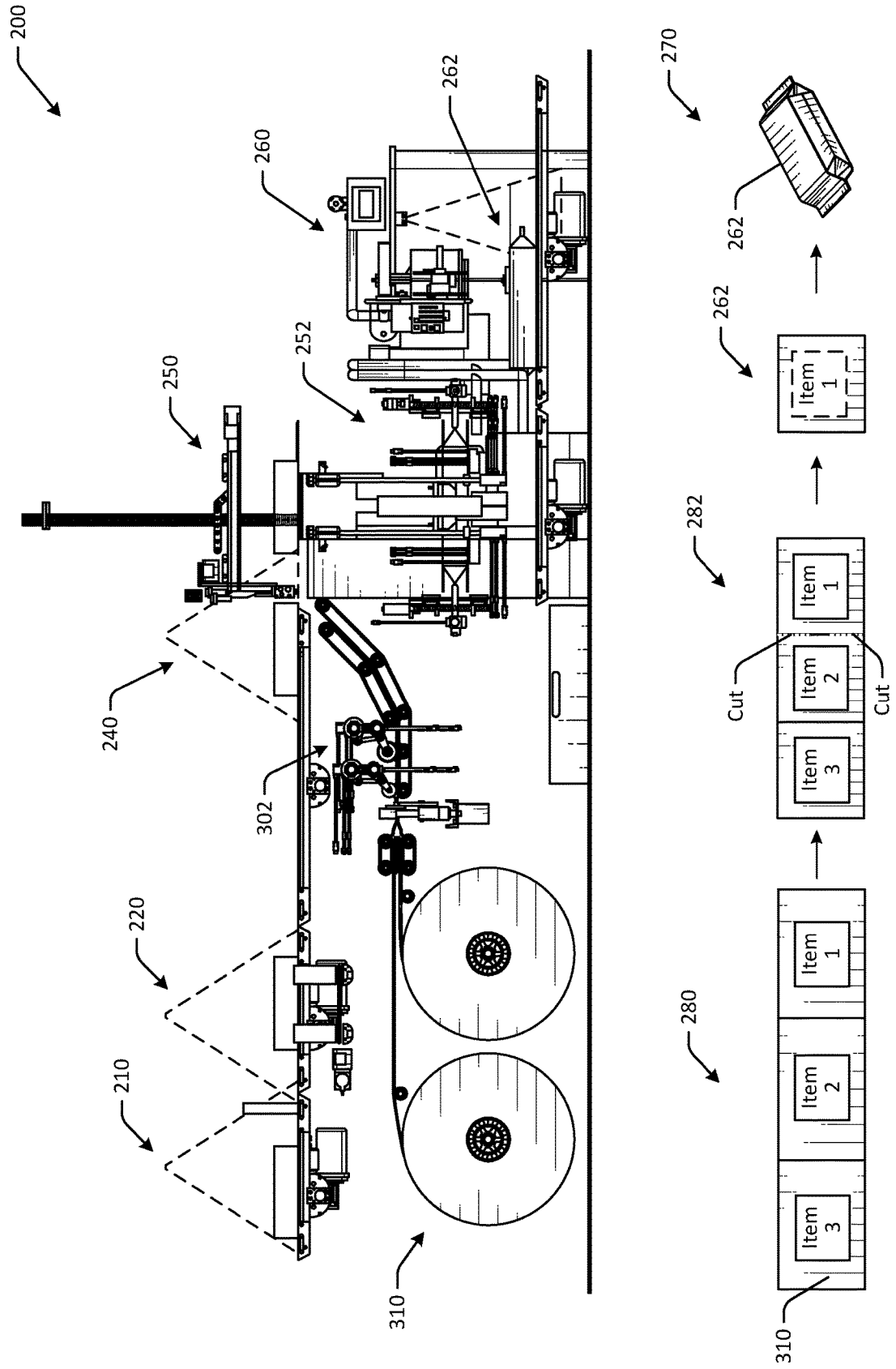

FIGS. 2A-2B are schematic illustrations of an example roll-formed container generation system 200 and an example roll-formed container 262 in various views in accordance with one or more embodiments of the disclosure. Other embodiments may include additional or fewer components. The illustrations of FIGS. 2A-2B may not be to scale, and may not be illustrated to scale with respect to other figures. The roll-formed container generation system 200 illustrated in FIGS. 2A-2B is for illustrative purposes only, and other embodiments may have a different configuration. The roll-formed container generation system 200 may be used at, for example, any of the packing stations discussed with respect to FIG. 1.

In FIG. 2A, the roll-formed container generation system 200 may be configured to receive items for packing, and to pack the items into custom sized roll-formed containers, such as the roll-formed container 262. Items may be inducted at the roll-formed container generation system 200 and measured at a measurement portion 210 of the roll-formed container generation system 200. One or more sensors, such as infrared LEDs, light arrays, cameras, and/or other sensors, may be used to determine various dimensions of the item, such as a height, a width, and/or a length of the item. In some embodiments, based on the dimensions of the item, the roll-formed container generation system 200 may determine whether a roll-formed container can be formed for the item. For example, if the item has a height that exceeds a threshold, the roll-formed container generation system 200 may be unable to produce a roll-formed container for the item. Accordingly, such items may be ejected from the roll-formed container generation system 200 at a centering portion 220 of the roll-formed container generation system 200. For example, ejected items may be pushed using an arm or conveyed using a conveyor onto an ejected item portion 230 of the roll-formed container generation system 200. Items for which a roll-formed container can be formed may be centered on a conveyor at the centering portion 220 by the arm used to eject items (e.g., the same arm may be used for centering and/or ejecting items, etc.). The roll-formed container generation system 200 may include a container formation portion 240 where a packaging material is scored and creased to form a container around the item. At an adhesive application portion 250 of the roll-formed container generation system 200, adhesive may be applied to the packaging material, and the roll-formed container may be folded and sealed at a folding and sealing portion 260 of the roll-formed container generation system 200, a shipping label may be applied and the package may be optionally compressed to ensure adhesive bonding, and the completed roll-formed container 262 or package may be output from the roll-formed container generation system 200. The folding and sealing portion 260 is partially depicted in side view in FIG. 2A and illustrates the completed roll-formed container 262 with inward facing gussets being output from the roll-formed container generation system 200 ready for shipment.

A side view of the roll-formed container generation system 200 is depicted in FIG. 2B. The roll-formed container generation system 200 may include one or more webs or rolls of packaging material 310 that may be automatically spliced when one roll or web is complete, so as to avoid downtime. One or more scoring devices 302 configured to score crease lines on the packaging material 310 may be included. A sealing portion 252, which may include one or more compress bars and/or gusset forming pins or supports may be disposed vertically lower than the adhesive application portion 250 in some embodiments, so as to reduce a footprint of the roll-formed container generation system 200.

An example flow of items in the roll-formed container generation system 200 is depicted in FIG. 2B, where the items are disposed on unwound packaging material 310 as the packaging material is routed through the roll-formed container generation system 200. At a first instance 280, items may be input at the roll-formed container generation system 200 for packing. One or more robotic arms may be used to place the items onto a first conveyor for an induction process into the roll-formed container generation system 200. During the induction process, one or more cameras or other sensors, such as LIDAR sensors, depth sensors, infrared LEDs, and so forth may be used to determine one or more dimensions of the items. For example, a first sensor may be used to capture one or more top-down images of the items, and a second sensor may be used to capture one or more side-view images or dimensions of the items. The sensor(s) may generate data that is used to determine one or more dimensions of the items. For example, the sensor(s) may be depth cameras or depth sensors used to generate data points that can be processed to determine one or more dimensions of the items. The items may flow along the first conveyor onto a portion of packaging material 310. The packaging material 310 may be a roll-formed packaging material, such as corrugate, or a different packaging material, such as a non-Gaussian packaging material, an unpadded packaging material, or the like. In some embodiments, any material that can be creased or bent can be used. Although dual rolls of the packaging material 310 is depicted, other embodiments may include additional or fewer rolls of packaging material, and some or all of the packaging materials may have different widths, such as widths of 27 inches and 35 inches to provide added flexibility in packaging items of different dimensions. The packaging material 310 may flow along a second conveyor that moves at the same speed, or substantially the same speed, as the first conveyor.

The items may therefore flow seamlessly from the first conveyor onto the packaging material 310 on the second conveyor. On the second conveyor, the items may be imaged during a positioning confirmation process at the centering portion 220. During the positioning confirmation process, a position of the items on the packaging material 310 may be determined using one or more sensors. The position of the items may be compared to a predetermined boundary to determine whether the items is sufficiently positioned at or near a center of the packaging material 310. If a positioning adjustment is needed, a second robotic arm may be used to adjust or reposition the items on the packaging material 310.

Based at least in part on the dimensions of the items, a length of packaging material to be used for packaging the items may be determined. The length of packaging material may be adjusted by dispensing the determined amount of packaging material 310 from the roll of packaging material.

In addition to the length of packaging material, a width between fold lines that are to be made on the packaging material 310 may be determined. The width between fold lines may correspond to a width of the items. The fold lines may be creases, score lines, perforations, or other features that facilitate bending of the packaging material 310. In some embodiments, fold lines may be embossed, serrated, perforated, texturized, or otherwise deformed. To impart the fold lines onto the packaging material 310, one or more adjustable rollers, rolling dies, or dies may be used at the scoring device(s) 302. As the packaging material 310 is fed forward, in addition to roll forming, partial width slitting may optionally occur as the packaging material 310 contacts the rolling dies. The slits may be cut, for example, with one or more rotary blades, with one cut on either side of the material, where the slitting process is performed while the packaging material 310 is stationary (e.g., between roll forming processes, etc.). The rolling dies may be adjustable in one or more lateral direction to increase or decrease separation between a first rolling die and a second die rolling die of the adjustable end scoring assembly. The rolling dies may move along a shaft, as discussed with respect to FIGS. 6A-6B. The rolling dies may have any suitable pattern, such as Y-shaped patterns, triangular patterns, diamond patterns, circular patterns, linear patterns, or other types of patterns. In some embodiments, the rolling dies may be heated, which may increase the number of different types of packaging materials that can be used with the roll-formed container generation system 200. In some embodiments, the rolling dies may be used on the packaging material 310 before the items is placed onto the packaging material 310, whereas in other embodiments, individual rolling dies may be used to create the fold lines on the packaging material 310 after the item is positioned on the packaging material 310. In some embodiments, to effect the fold lines on the packaging material 310, a single roller may be used to press the packaging material 310 against one or more rolling dies that may be statically positioned. In other embodiments, the rolling dies may be movable. More than one set of rollers and/or rolling dies may be used to impart the fold lines onto the packaging material. Fold lines are discussed in detail with respect to FIG. 7B. As the packaging material 310 is unwound and flows toward the second conveyor, hot melt or another adhesive may be applied at the adhesive application portion 250. A shipping label may be applied and may be verified using a scanner or other hardware.

After positioning of the items on the packaging material 310 is confirmed to be acceptable, or after the item is repositioned and then confirmed to be within the predetermined boundary, an adhesive or sealant, such as a hot melt glue, pressure-sensitive adhesive, tape, glue, thermal sealing component, or other adhesive or sealant may be applied about one or more edges and/or the width of the packaging material. For example, in some embodiments, adhesive may be applied about three sides of the packaging material 310, as depicted in FIG. 7B. In other embodiments, adhesive may be applied along less than three sides of the packaging material 310 while the packaging material 310 and the item are in motion, so as to increase throughput. To apply the adhesive, the adhesive may be sprayed, applied in a beaded or spiral pattern, or otherwise distributed along one or more surfaces of the packaging material 310. In some embodiments, before the items is placed on the packaging material 310, a portion of the adhesive may be applied. The length of adhesive may correspond to the determined length of packaging material 310 to be used for packaging of the items.

After the adhesive is applied, the process may continue to the folding and sealing portion 260 at which the packaging material may be folded around the item and optionally compressed to seal the package via bonding of the adhesive. In some embodiments, the cutting and folding station 260 may be a walking jaw and may create two parallel seals at the same time or substantially the same time (e.g., consecutive seals, etc.). In an example, one seal may be at the end of a package, and another seal may be the front end of an adjacent package. The cutting and folding station 260 may include an integrated cutting/severing blade, which may be used to cut or trim the unglued area in between parallel seals. As the walking jaw or cutting and folding station 260 slides along the packaging material 310, space between seals may be trimmed as the seals are formed. As the packaging material is folded, an amount of overlap between a first side and a second side may be adjusted so as to form a package that custom fits the items.

After the sides are folded, the sides may be pressed or compressed to cause the adhesive to bind the package edges and the overlap together to form the sealed package 262 about the items. In some embodiments, the folders may be used to form inward-facing gussets depending on a type of package that to be formed, as discussed with respect to FIG. 8B. The sealed package 262 may be pushed onto or otherwise fed onto a takeaway container for downstream processing of the sealed package 262.

The roll-formed container generation system 200 may therefore be an item packing station that includes a number of components. For example, the roll-formed container generation system 200 may include the first conveyor configured to transport the items for packing, and a second conveyor configured to transport the packaging material 310. The second conveyor may be disposed adjacent to the first conveyor, and both the first conveyor and the second conveyor may be configured to move at substantially the same speed or at the same speed, so as to facilitate handoff between the respective first conveyor and the second conveyor. The roll-formed container generation system 200 may include a number of cameras or other sensors that may be used along various points and/or positions. For example, the roll-formed container generation system 200 may include a first sensor system configured to image the items. The first sensor system may include one or more cameras or other sensors and may be configured to generate data used to determine dimensions of the items. A second sensor system may be configured to image the items on the packaging material 310 to determine whether positioning of the items falls within a predetermined boundary. In an embodiment, the roll-formed container generation system 200 may include two sensors used to determine item dimensions, one sensor to determine positioning of the item prior to handoff of the item, and another sensor to determine correct positioning of the item on the packaging material.

The roll-formed container generation system 200 may include a set of one or more rolling dies configured to crease or otherwise impart formations on the packaging material 310. The roll-formed container generation system 200 may include a controller configured to determine, using the first sensor system, a first dimension of the items, such as a width or a height, and to determine a length of packaging material 310 to use for packing the items, where the length is determined using the first dimension. The controller may be configured to cause a first crease line and a second crease line to be formed on a surface of the packaging material 310 using the set of one or more rolling dies. The controller may be configured to cause a first side of the packaging material to be folded over the items, and to cause a second side of the packaging material to be folded over the first side of the packaging material to form an overlapping portion. The width of the overlapping portion may be adjusted based at least in part on the size of the items. The controller may be configured to cause ends of the packaging material to be pressed to form a package, where the item is disposed in the package.

Accordingly, in one embodiment, the system may include a controller. A first sensor system may be used to determine a first dimension of a first item for packing into a custom sized container. For example, the controller may cause the first item to be transported to the packaging material via a conveyor moving at a first speed, wherein the packaging material is moving at the first speed when the first item flows onto the packaging material. The first sensor system may include one or more cameras, such as depth cameras or other sensors, in different positions. In one embodiment, a sensor may be coupled to a robotic arm and used to image various angles of the first item to determine the first dimension. The first dimension may be a height, length, or width of the first item. In some embodiments, more than one sensor may be used to determine one or more dimensions of the first item. Data generated using the respective sensors may be used to determine one or more dimensions of the item.

The system may determine, using the controller, a length of packaging material to use for packing the first item based at least in part on the first dimension. For example, based at least in part on a length of the first item, a length of packaging material may be determined that corresponds to the length of the item. In another example, the width or height of the first item may be used to determine the length of packaging material. The determined length may be used to determine how much packaging material is to be unrolled or otherwise used to package the first item. For example, the controller may cause the packaging material to advance from a roll of packaging material until the length of packaging material to use for packing the first item is advanced.

The system may cause a first crease line and a second crease line to be formed on a surface of the packaging material. For example, the controller may cause one or more rollers or rolling dies to contact the packaging material and to impart crease lines onto the packaging material. Crease lines may be fold lines, score lines, perforations, or other lines that form depressions in a surface of the packaging material, and may facilitate bending of the packaging material. Depending on the type of packaging material, the packaging material may not crease, and when unsealed, may return to a substantially flat shape. The rollers or rolling dies may be adjustable to form crease lines with various separation distances, so as to accommodate items of different sizes. In some instances, the rollers or rolling dies may be heated to be effective with an increased number of packaging materials. In some embodiments, in addition to crease lines, tessellations or other patterns may also be formed adjacent to the crease lines to form flexible sidewalls of the package. An adhesive may be applied about one or more portions of the packaging material before or after the crease lines are formed. For example, the controller may cause, using one or more adjustable rollers, a first crease pattern to be formed adjacent to the first crease line on the surface of the packaging material, and, using the one or more adjustable rollers, a second crease pattern to be formed adjacent to the second crease line on the surface of the packaging material.

The system may cause a first side of the packaging material to be folded over the first item. For example, the controller may cause one or more folding assemblies to fold a first side of the packaging material over a top of the first item. Before the first side is folded, the controller may determine, using a second sensor system, whether the first item is positioned in a first position on the packaging material that exceeds a predetermined boundary. If the boundary is exceeded, the first item may be repositioned using a robotic arm or other hardware, or a notification for manual intervention may be generated. For example, the controller may cause the first item to be repositioned from the first position to a second position within the predetermined boundary. Similarly, a second side of the packaging material may be caused to be folded over the first side of the packaging material to form an overlapping portion. For example, the controller may cause one or more folding assemblies to fold a second side of the packaging material over the first side of the packaging material to form an overlapping portion using one or more folders. The amount of overlap may be adjusted based on one or more dimensions of the first item, thereby forming a custom sized container. A height of the package may be adjustable by adjusting an amount of overlap of the overlapping portion. In some embodiments, to form certain types of packages, such as flat mailers or envelopes, there may not be an overlapping portion for the package. Instead, a first side may be folded over the other, and the second side may not be folded.

Ends of the packaging material may be caused to be sealed to form a package, where the first item is disposed in the package. One or more compress bars or other equipment may be caused, by the controller, to add pressure to the ends and/or the overlapping portion of the packaging material to seal the package. The remaining portion of the packaging material may be cut and the sealed package may be transferred for downstream processing. Sealing may include sewing, pressing, folding, or otherwise closing the package.

Figure 3A:
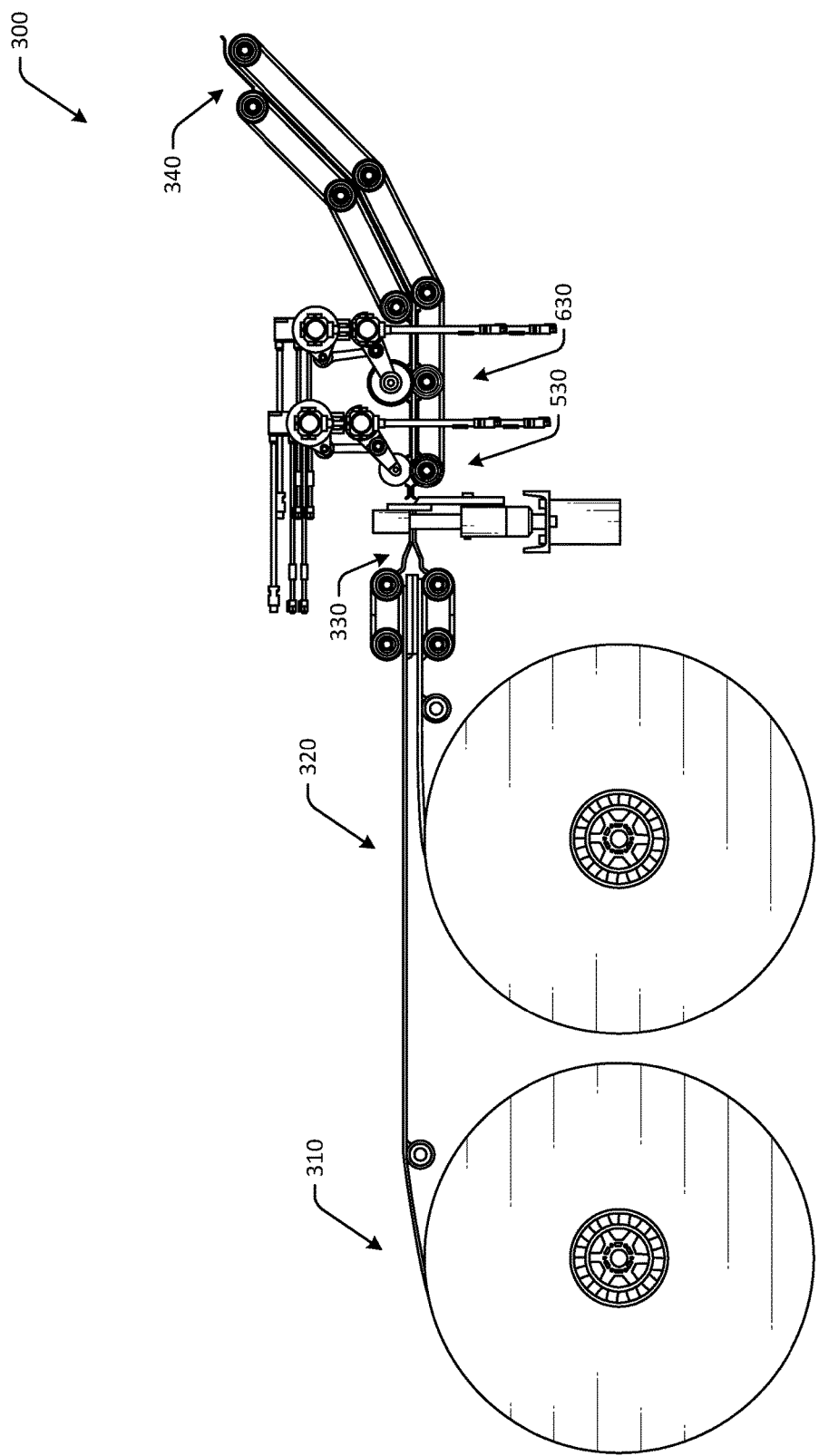
FIGS. 3A-3B are schematic illustrations of example packaging material splicing components and additional system components in various views in accordance with one or more embodiments of the disclosure.
Figure 3B:
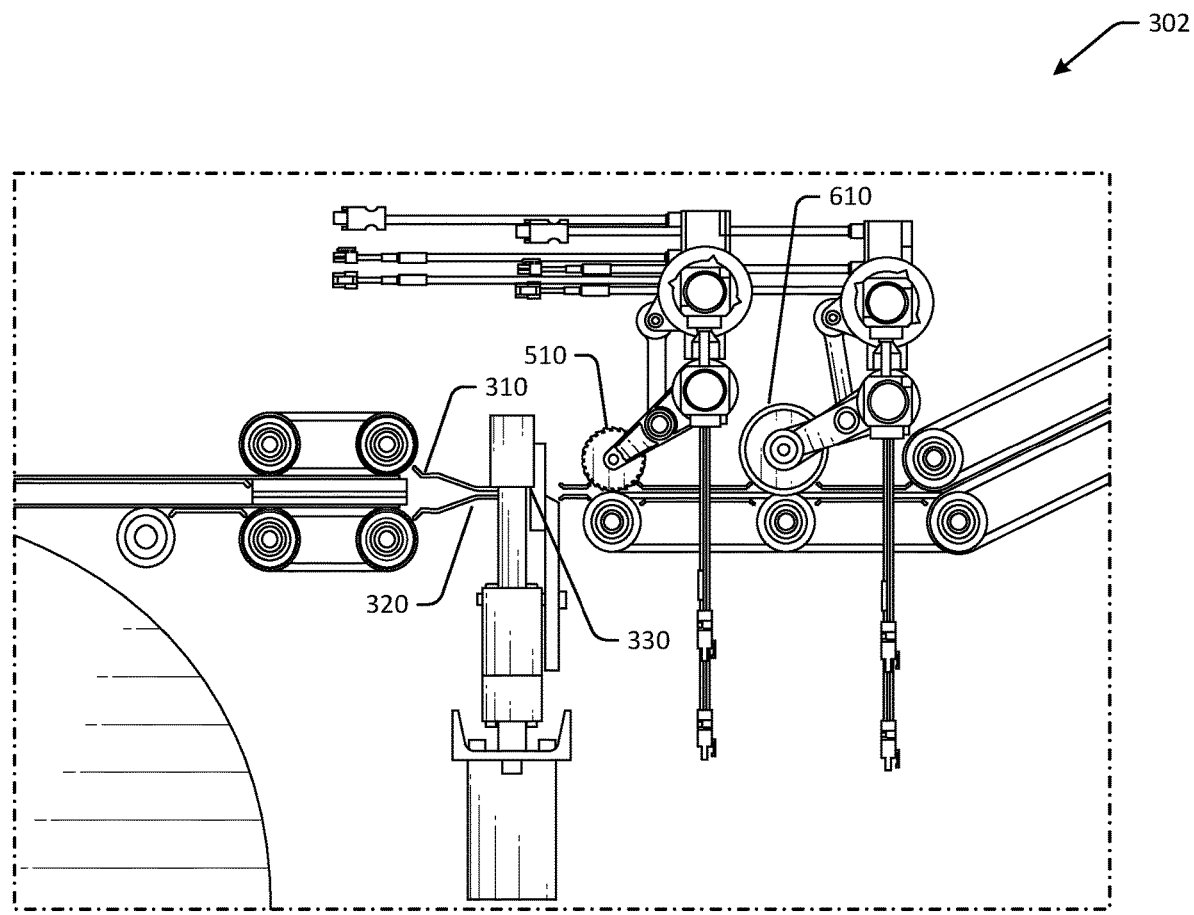

FIGS. 3A-3B are schematic illustrations of example packaging material splicing components and additional system components in various views in accordance with one or more embodiments of the disclosure. Other embodiments may include additional or fewer components. The illustrations of FIGS. 3A-3B may not be to scale, and may not be illustrated to scale with respect to other figures. The components illustrated in FIGS. 3A-3B are for illustrative purposes only, and other embodiments may have a different configuration. The components illustrated in FIGS. 3A-3B may be the same as some of the components discussed with respect to FIGS. 1-2B.

In FIG. 3A, a portion of a roll-formed container generation system 300 is depicted with a first roll of packaging material 310, a second roll of packaging material 320, an automatic splicing device 330, a first scoring device, which may be a longitudinal scoring device 530, a second scoring device, which may be an end pattern scoring device 630, and a downstream conveyor 340. The longitudinal scoring device 530 and end pattern scoring device 630 are discussed in more detail with respect to FIGS. 5A-6B.

The first roll of packaging material 310 and second roll of packaging material 320 may be rolls of the same packaging material. When one roll of packaging material is near completion, such as less than 1%, 2%, 5%, 7%, etc. remaining, the automatic splicing device 330 may be used to transfer unwinding of the nearly finished roll of packaging material to the other roll of packaging material in a seamless manner, such that package formation is uninterrupted. In some embodiments, the automatic splicing device 330 may include a cutter and/or tape or adhesive applicator to join an end piece of one roll of packaging material to a beginning piece of the other roll of packaging material, where the automatic splicing device 330 includes one or more rollers configured to unwind both rolls of packaging material at substantially the same speed. In other embodiments, an end piece of a packaging roll may be recycled and a beginning piece of the other roll of packaging material may be used for a subsequent item, instead of using portions of both rolls to form a container for the item.

In FIG. 3B, the automatic splicing device 330 is depicted in detail, with a portion of the first roll of packaging material 310 being unwound by one or more rollers, and a portion of the second roll of packaging material 320 being unwound by a separate set of one or more rollers, where both sets of rollers are operated at the same speed. As the spliced packaging material moves through past the automatic splicing device 330, the packaging material may be scored via a first creasing wheel 510 and a first rolling die 610 in one example embodiment.

Figure 4:
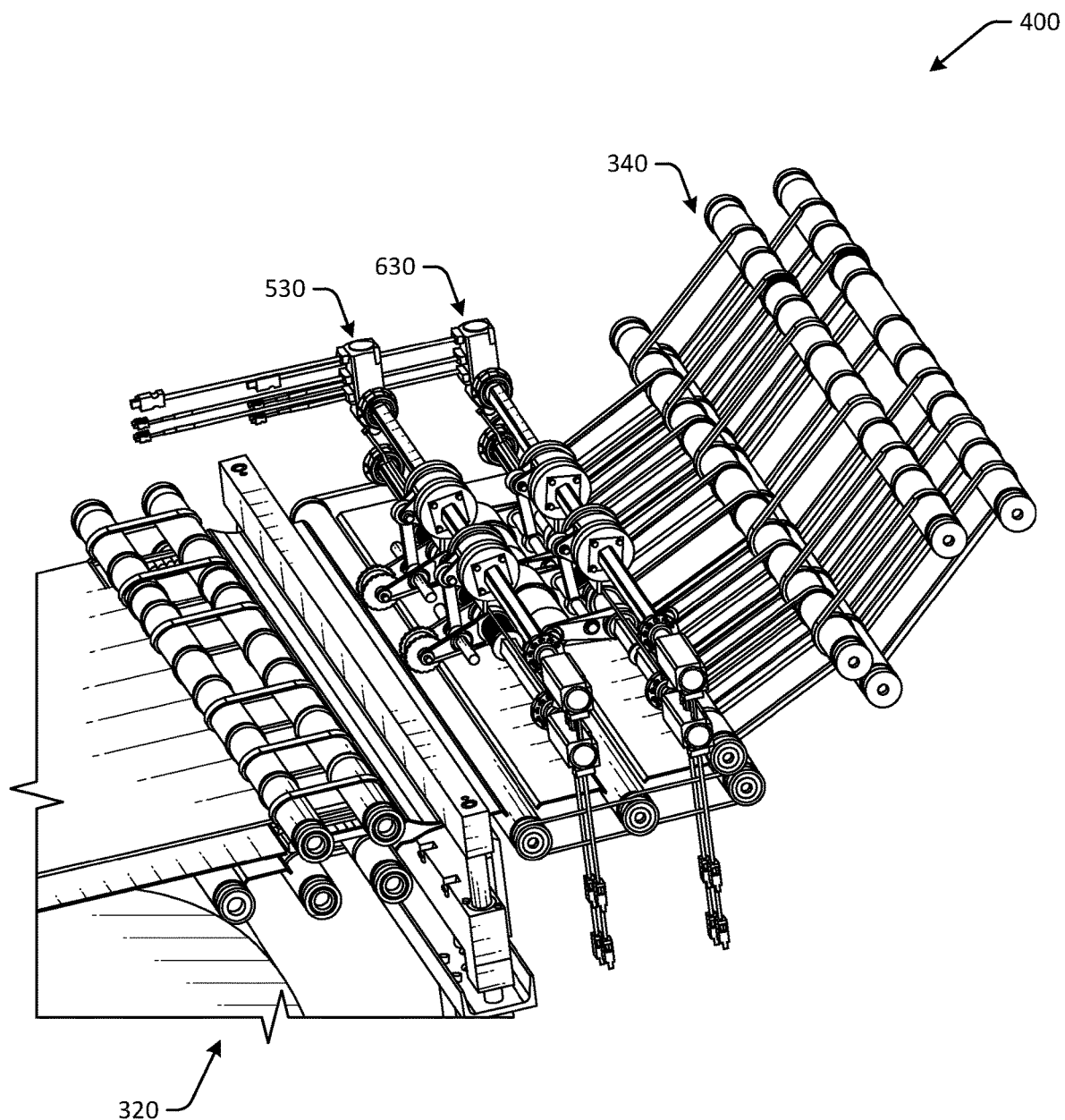
FIG. 4 is a schematic illustration of a portion of a roll-formed container generation system that includes scoring devices in accordance with one or more embodiments of the disclosure.

FIG. 4 is a schematic illustration of a portion of a roll-formed container generation system 400 that includes scoring devices in accordance with one or more embodiments of the disclosure. Other embodiments may include additional or fewer components. The illustration of FIG. 4 may not be to scale, and may not be illustrated to scale with respect to other figures. The portion of a roll-formed container generation system 400 depicted in the examples of FIG. 4 is for illustrative purposes only. Other embodiments may have different configurations. The components illustrated in FIG. 4 may be the same as some of the components discussed with respect to FIGS. 1-3B.

The roll-formed container generation system 400 may be a system configured to produce a roll-formed container using one or more rolls of packaging material, such as the second roll of packaging material 320. The roll-formed container generation system 400 may include a first scoring device 530, which may be a longitudinal scoring device, and a second scoring device 630, which may be an end scoring device. The first scoring device 530 and the second scoring device 630 may be configured to score the packaging material. The first scoring device 530 may be disposed upstream of the second scoring device 630. In other embodiments, the first scoring device 530 may be disposed downstream of the second scoring device 630. A downstream conveyor 340 may convey the scored packaging material downstream.

Figure 5A:
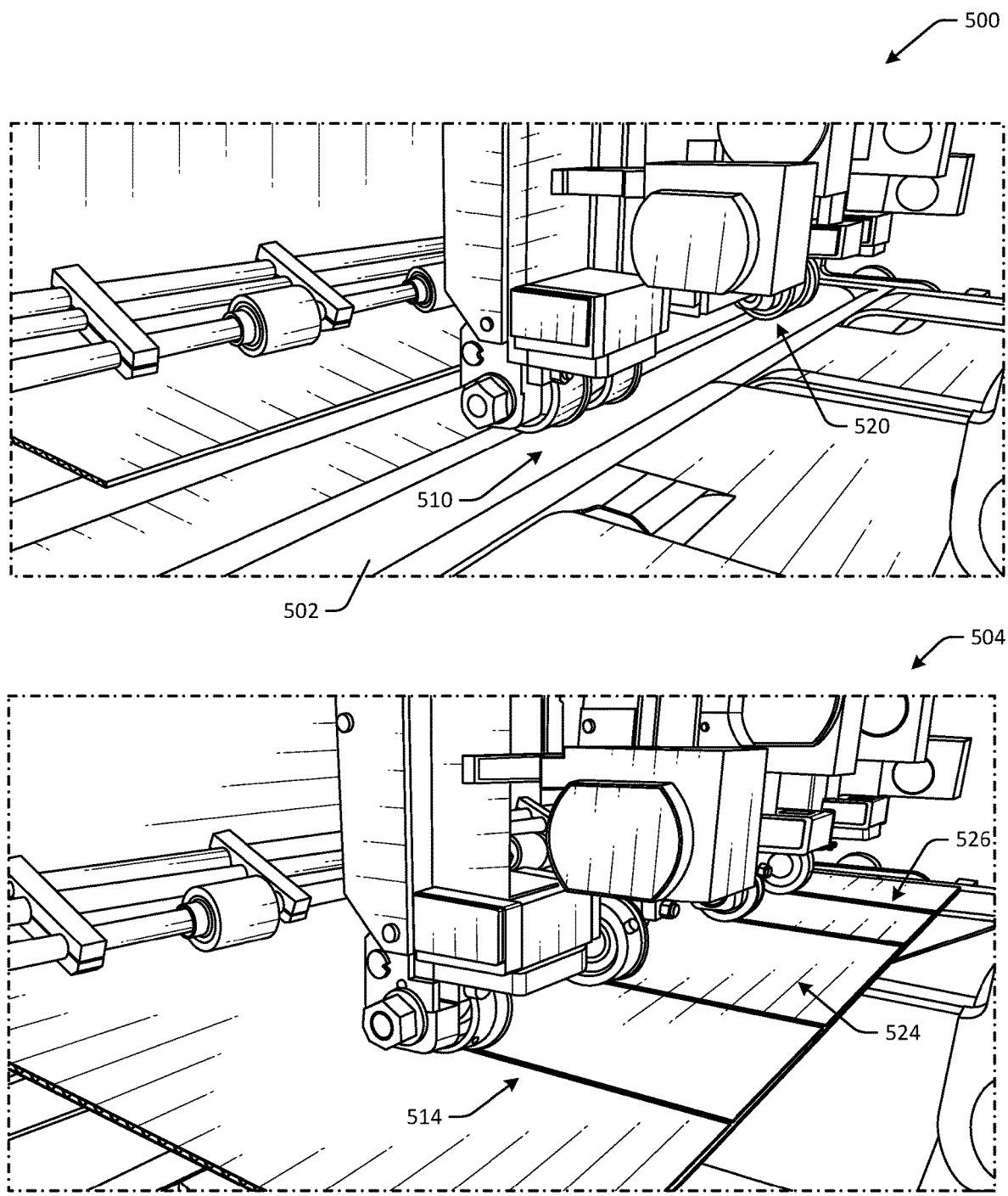
FIGS. 5A-5B are schematic illustrations of an example longitudinal crease line scoring device in various views in accordance with one or more embodiments of the disclosure.
Figure 5B:
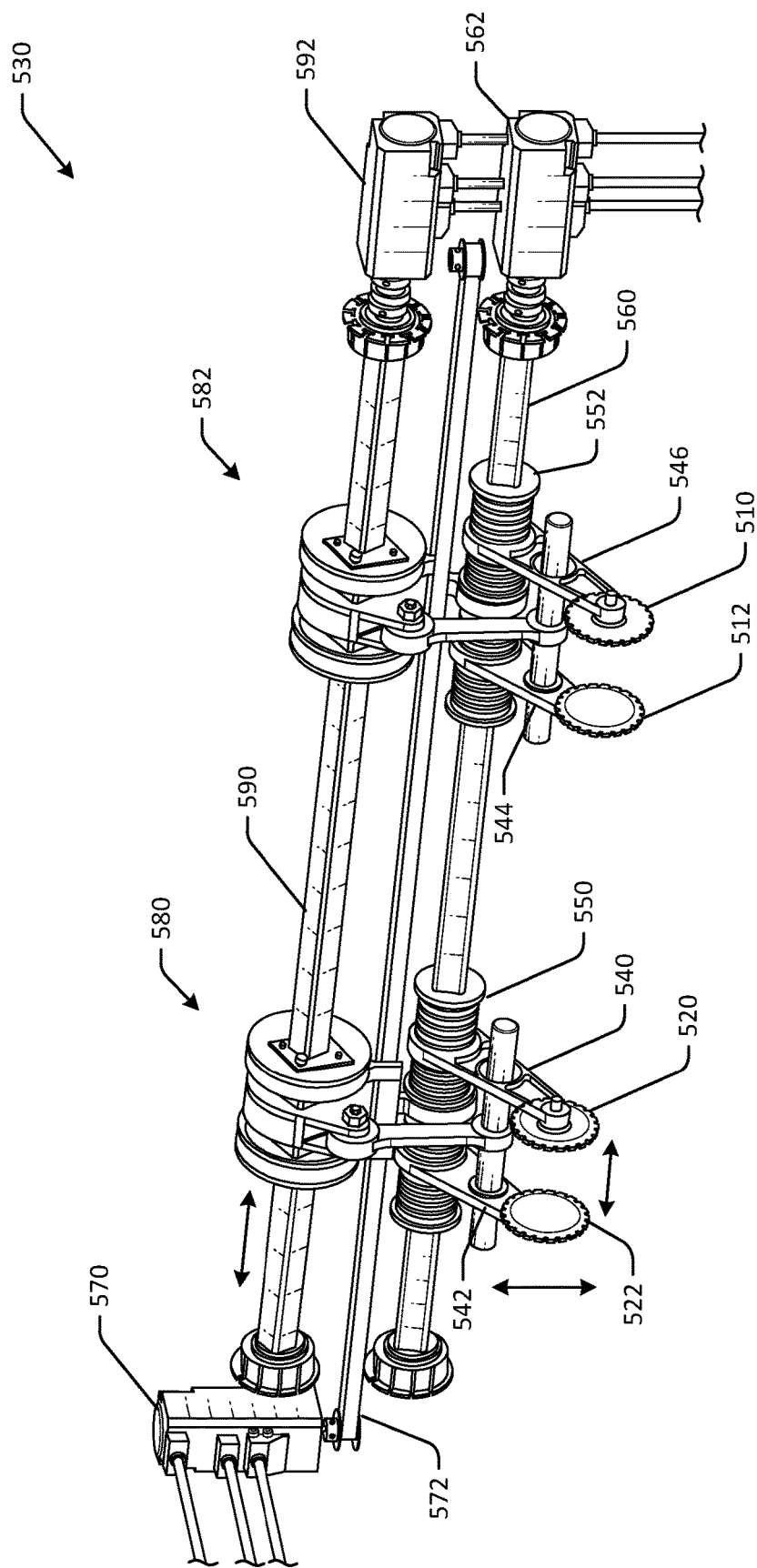

The first scoring device 530 may include one or more creasing wheels and may be configured to score the packaging material with a longitudinal score lines along some or all a length of the packaging material, as discussed with respect to FIGS. 5A-5B.

Figure 6A:
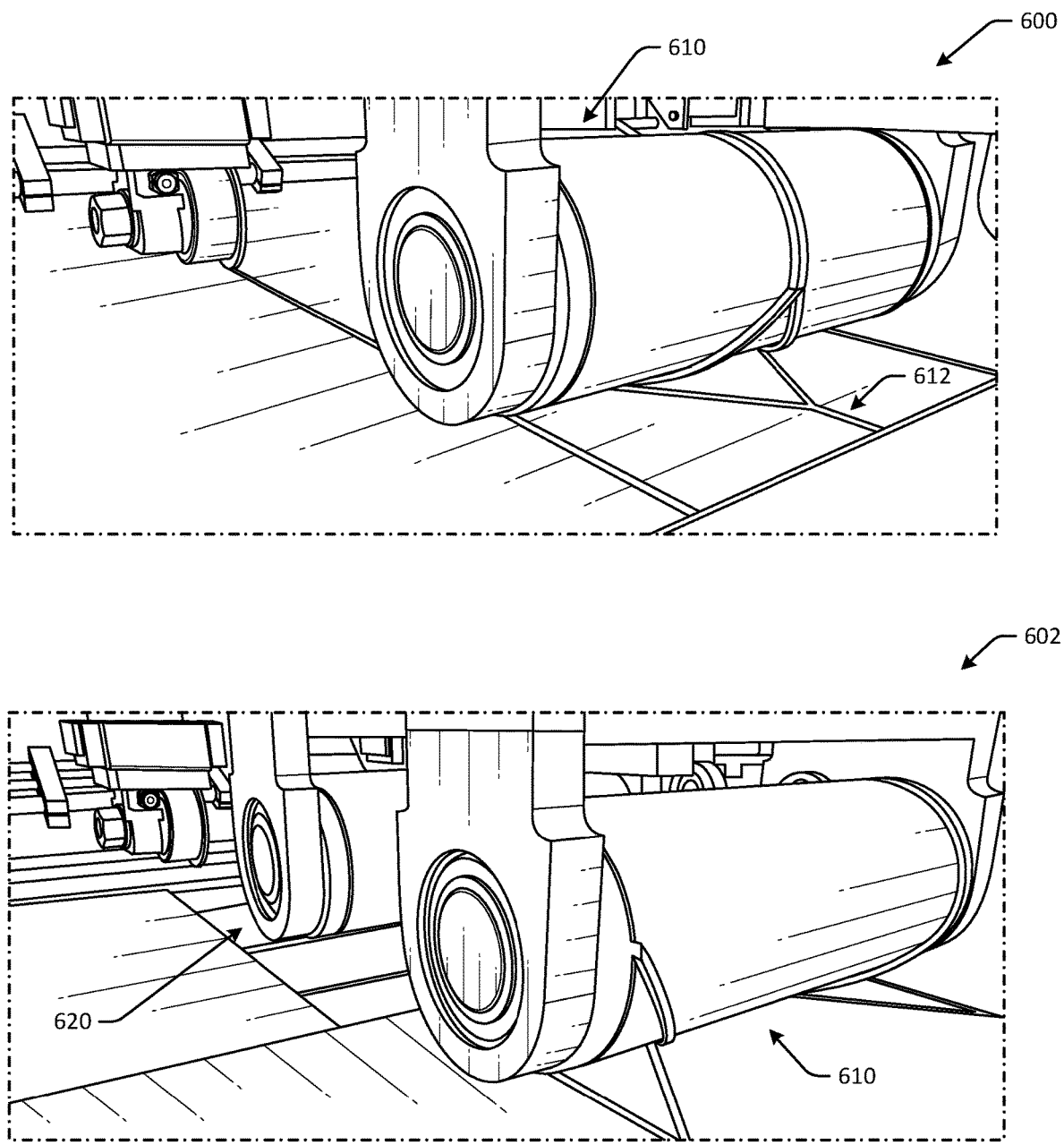
FIGS. 6A-6B are schematic illustrations of an example end crease pattern scoring device in various views in accordance with one or more embodiments of the disclosure.
Figure 6B:
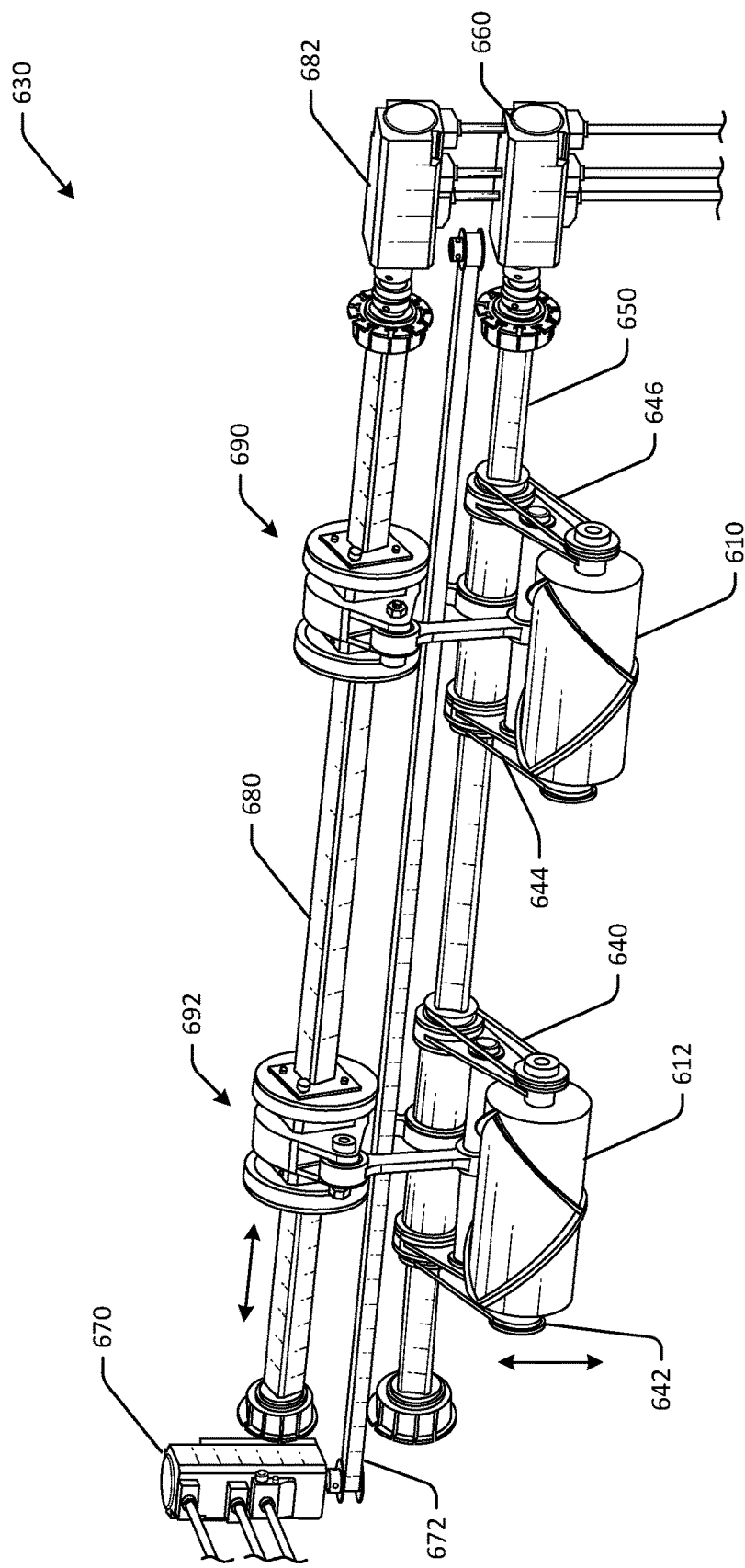

The second scoring device 630 may include one or more rolling dies and may be configured to score one or both ends of the packaging material with a crease pattern, as discussed with respect to FIGS. 6A-6B. In some embodiments, to score only the ends of the packaging material (e.g., the forward and rear ends, etc.), rotation of the first rolling die and the second rolling die may be paused for at least a portion of time when the creasing wheels of the first scoring device 530 score the packaging material. The crease patterns of the second scoring device 630 may be formed between one or more pair of crease lines formed by the first scoring device. In some embodiments, the crease pattern(s) formed by the second scoring device have a Y-shaped pattern, where at least a portion of the Y-shaped pattern may extends over each line of a pair of crease lines, without impacting the ability to roll-form containers for thin items, such as magazines.

FIGS. 5A-5B are schematic illustrations of an example longitudinal crease line scoring device in various views in accordance with one or more embodiments of the disclosure. Other embodiments may include additional or fewer components. The illustrations of FIGS. 5A-5B may not be to scale, and may not be illustrated to scale with respect to other figures. The sample fold lines or crease patterns depicted in the examples of FIGS. 5A-5B are for illustrative purposes only. Other embodiments may have different lines, patterns, dimensions, or other configurations. The components illustrated in FIGS. 5A-5B may be the same as some of the components discussed with respect to FIGS. 1-4.

In FIG. 5A, a system 500 may include the longitudinal crease line scoring device 530. The longitudinal crease line scoring device 530 is depicted having a first scoring assembly 582 and a second scoring assembly 580. Other embodiments may have additional or fewer scoring assemblies. The longitudinal crease line scoring device 500 may be configured to create scores or creases in packaging material using the first scoring assembly 582 and/or the second scoring assembly 580. A rubber surface 502 or other type of compliant surface may be disposed vertically aligned with the longitudinal crease line scoring device 500, so as to prevent the score or crease lines from going through the packaging material. The longitudinal crease line scoring device 500 may generate a first pair of crease lines 514 using the first scoring assembly 582 and a second pair of crease lines 526 using the second scoring assembly 580. The first pair of crease lines 514 and the second pair of crease lines 526 may be separated by a distance 524 that corresponds to a width or length of an item to be wrapped in the packaging material.

In FIG. 5B, the longitudinal crease line scoring device 530 is depicted in isolated view. The longitudinal crease line scoring device 530 may include the first scoring assembly 582 and the second scoring assembly 580. The longitudinal crease line scoring device 530 may include a first support member 560. The first scoring assembly 582 and the second scoring assembly 580 may be coupled to the first support member 560.

The first scoring assembly 582 may include a first base 552 configured to slide along the first support member 560, such that the first scoring assembly 582 can move to different positions on the first support member 560. The first scoring assembly 582 may include a first creasing wheel 510, and a first arm 546 coupled to the first creasing wheel 510 and the first base 552. The first scoring assembly 582 may include a second creasing wheel 512 and a second arm 544 coupled to the second creasing wheel 512 and the first base 552. The second arm 544 and/or the first arm 546 may be configured to slide along the first base 552, such that a distance between the first creasing wheel 510 and the second creasing wheel 512 can be adjusted. The first arm 546 and/or the second arm 544 may be configured to rotate about the first support member 560. The first scoring assembly 582 may therefore be configured to score a first pair of linear lines along the packaging material. Other embodiments may have additional or fewer creasing wheels and/or different mechanical assemblies. In some embodiments, the longitudinal crease line scoring device 530 may include a second support member 590 that includes one or more linkage components coupled to the first scoring assembly 582 and/or the second scoring assembly 580, where the linkage components may be configured to cause the respective creasing wheels to engage a packaging material surface by causing rotation of the respective scoring assemblies with respect to the first support member 560. An optional third support member 572 or linkage component may be configured to cause lateral movement of the respective creasing wheels or arms of the first scoring assembly 582 and second scoring assembly 580 along the first support member 560. For example, an actuator 570, such as a motor, may be coupled to the optional third support member 572 or linkage component and may cause movement of an associated component, such as a belt or pulley, to impart lateral movement to the arms of the first scoring assembly 582 and/or the second scoring assembly 580 to modify a distance between the respective creasing wheels for both scoring assemblies.

The second scoring assembly 580 may include a second base 550 configured to slide along the first support member 560, such that the second scoring assembly 580 can move to different positions on the first support member 560. The second scoring assembly 580 may include a third creasing wheel 520, and a third arm 540 coupled to the third creasing wheel 520 and the second base 550. The second scoring assembly 580 may include a fourth creasing wheel 522 and a fourth arm 542 coupled to the fourth creasing wheel 522 and the second base 550. The fourth creasing wheel 522 and/or the third arm 540 may be configured to slide along the second base 550, such that a distance between the third creasing wheel 520 and the fourth creasing wheel 522 can be adjusted. The third arm 540 and/or the fourth arm 542 may be configured to rotate about the first support member 560. The second scoring assembly 580 may therefore be configured to score a first pair of linear lines along the packaging material. Other embodiments may have additional or fewer creasing wheels and/or different mechanical assemblies. In some embodiments, the longitudinal crease line scoring device 530 may include the second support member 590 that includes one or more linkage components coupled to the first scoring assembly 582 and/or the second scoring assembly 580, where the linkage components may be configured to cause the respective creasing wheels to engage a packaging material surface by causing rotation of the respective scoring assemblies with respect to the first support member 560.

The longitudinal crease line scoring device 530 may include a second actuator 592 configured to cause lateral movement of the linkage components for embodiments where the second support member 590 is included. The longitudinal crease line scoring device 530 may include a third actuator 562 configured to cause lateral movement of the first scoring assembly 582 and/or the second scoring assembly 580 along the first support member 560, and/or rotation of the first scoring assembly 582 and/or the second scoring assembly 580 with respect to the first support member 560.

FIGS. 6A-6B are schematic illustrations of an example end crease pattern scoring device in various views in accordance with one or more embodiments of the disclosure. Other embodiments may include additional or fewer components. The illustrations of FIGS. 6A-6B may not be to scale, and may not be illustrated to scale with respect to other figures. The sample fold lines or crease patterns depicted in the examples of FIGS. 6A-6B are for illustrative purposes only. Other embodiments may have different lines, patterns, dimensions, or other configurations. The components illustrated in FIGS. 6A-6B may be the same as some of the components discussed with respect to FIGS. 1-4.

In FIG. 6A, a system 600 may include the end crease pattern scoring device 630. The end crease pattern scoring device 630 is depicted in two embodiments in FIG. 6A. A first embodiment includes a single rolling die 610 used to form a crease pattern 612 at both ends of packaging material. A second embodiment 602 includes two staggered rolling dies, with a second rolling die 620 positioned upstream of the rolling die 610, where the two rolling dies form crease patterns at respective forward and rear ends of the packaging material (e.g., each rolling die forms the crease pattern at one end of the packaging material, etc.).

The end crease pattern scoring device 630 of the first embodiment is depicted in FIG. 6B. The end crease pattern scoring device 630 may include a first rolling die 610 having a crease pattern, and a first arm 646 coupled to the first rolling die 610. The end crease pattern scoring device 630 may include a second rolling die 612 having the crease pattern, and a second arm 640 coupled to the second rolling die 612. The end crease pattern scoring device 630 may include a first support member 650 configured to support the first arm 646 and the second arm 640, where the first arm 646 and the second arm 640 may be configured to slide along the first support member 650, such that a distance between the first rolling die 610 and the second rolling die 620 is adjusted. The first arm 646 and the second arm 640 may be configured to rotate about the first support member 650 from a first position to a second position, such that the first rolling die 610 and the second rolling die 612 move from the first position to the second position. The end crease pattern scoring device 630 may therefore be configured to score a first end and a second end of the packaging material with the crease pattern. The end crease pattern scoring device 630 may optionally include a third arm 644 coupled to the first rolling die 610 and the first support member 650, and/or a fourth arm 642 coupled to the second rolling die 612 and the first support member 650. Other embodiments may have additional or fewer rolling dies and/or different mechanical assemblies. In some embodiments, the end crease pattern scoring device 630 may include a second support member 680 that includes one or more linkage components 690, 692 coupled to the first rolling die 610 and/or the second rolling die 612, where the linkage components 690, 692 may be configured to cause the respective rolling dies to engage a packaging material surface by causing rotation of the respective scoring assemblies with respect to the first support member 650.

An optional third support member 672 or linkage component may be configured to cause lateral movement of the respective rolling dies or arms along the first support member 650. For example, an actuator 670, such as a motor, may be coupled to the optional third support member 672 or linkage component and may cause movement of an associated component, such as a belt or pulley, to impart lateral movement to the arms coupled to the first rolling die 610 and/or the second rolling die 612 to modify a distance between the respective rolling dies.

The end crease pattern scoring device 630 may include a second actuator 682 configured to cause lateral movement of the linkage components 690, 692 for embodiments where the second support member 680 is included. The end crease pattern scoring device 630 may include a third actuator 660 configured to cause lateral movement of the first rolling die 610 and/or the second rolling die 612 along the first support member 650, and/or rotation of the arms coupled to the rolling dies (rotation with respect to the first support member 650).

The first support member 650 may be coupled to an actuator, the first arm 640, and the second arm 646, where rotation of the first support member 650 imparts rotational motion to the first arm 640 and the second arm 646. In some embodiments, the actuators may be motors. For example, the end crease pattern scoring device 630 may include a first motor configured to cause both the first rolling die and the second rolling die to rotate with respect to the first support member 650, a second motor configured to cause the first arm 646 and the second arm 640 to rotate from the first position to the second position, and a third motor configured to cause the first arm 646 and the second arm 640 to slide along the first support member 650.

FIGS. 7A-7D are schematic illustrations of an adhesive application system 700 in various stages of operation and various views in accordance with one or more embodiments of the disclosure. Other embodiments may include additional or fewer components. The illustrations of FIGS. 7A-7D may not be to scale, and may not be illustrated to scale with respect to other figures. The components illustrated in FIGS. 7A-7D may be the same as some of the components discussed with respect to FIGS. 1-6B.

Figure 7A:
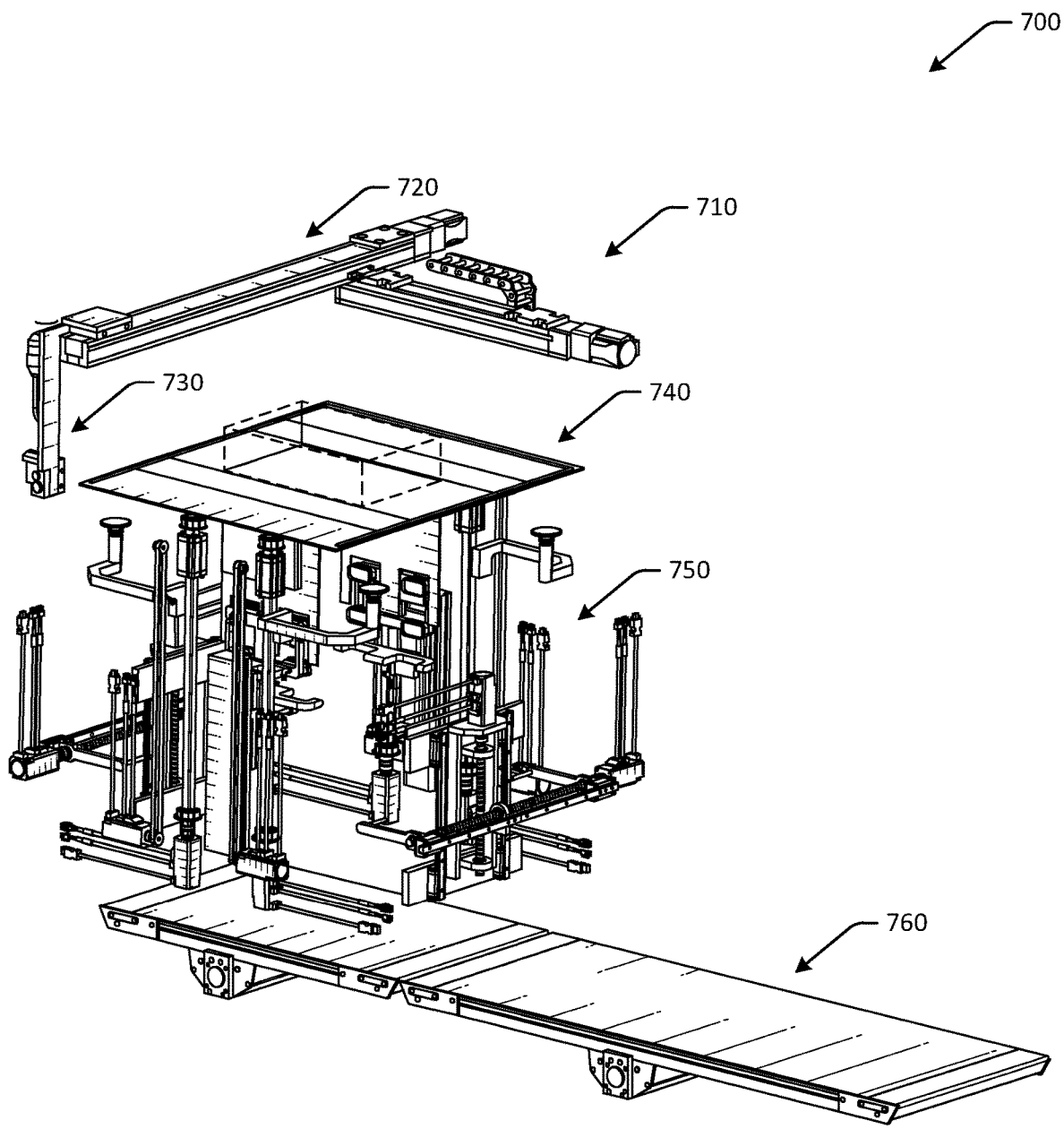
FIGS. 7A-7D are schematic illustrations of an adhesive application system in various stages of operation and various views in accordance with one or more embodiments of the disclosure.
Figure 7B:
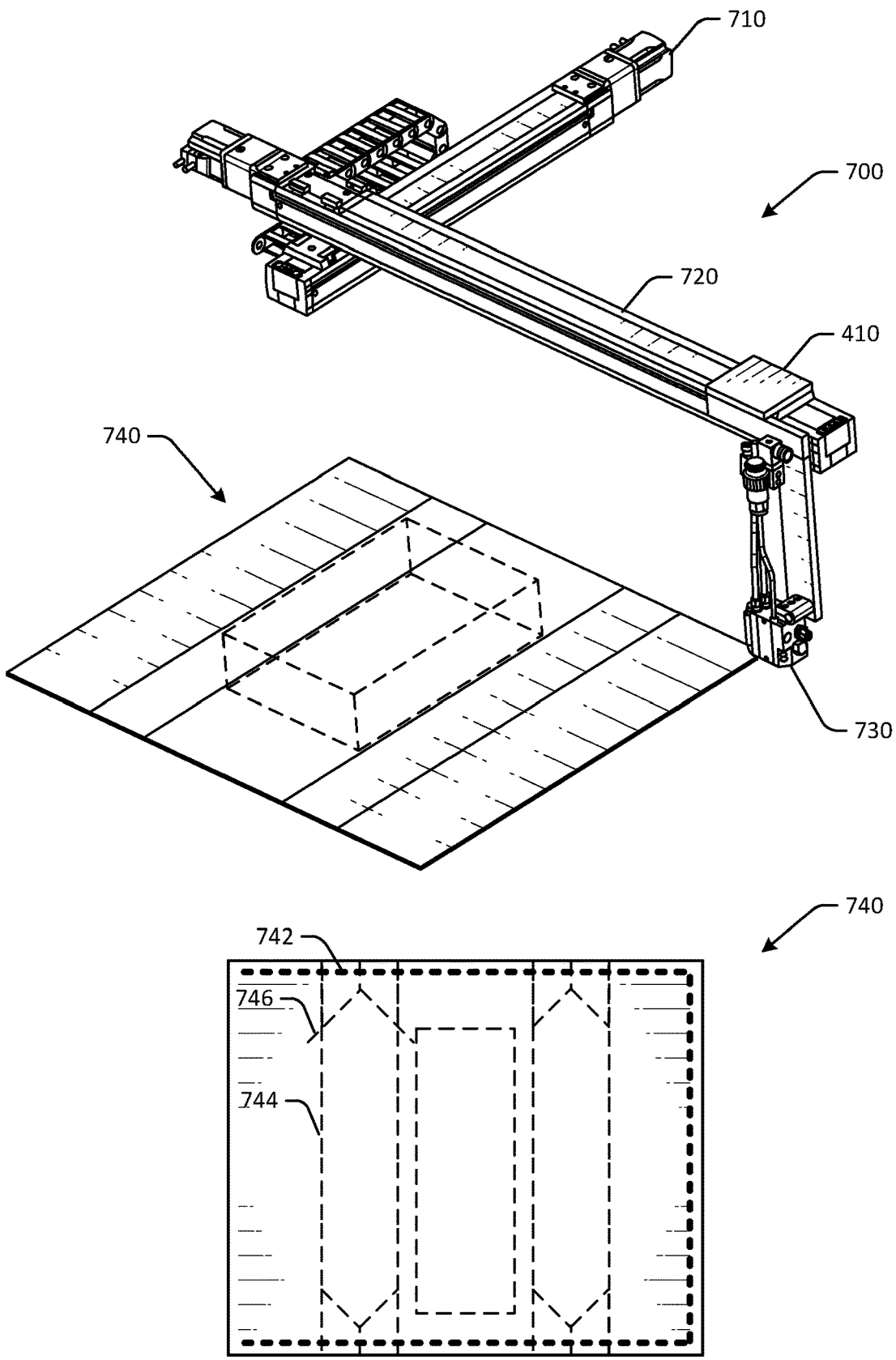

In FIG. 7A, the adhesive application system 700 is depicted in a partially isolated view. The adhesive application system 700 may be the adhesive application portion 250 discussed with respect to FIGS. 2A-2B. The adhesive application system 700 may be part of the system to produce a roll-formed container. The system may include a first conveyor configured to convey a packaging material 740. The adhesive application system 700 may be configured to apply adhesive to the packaging material 740.

The adhesive application system 700 may include an adhesive applicator 730 that is configured to dispense adhesive. The adhesive application system 700 may include an applicator support assembly configured to support the adhesive applicator 730, where the adhesive support assembly may be configured to move the adhesive applicator 730 in at least two dimensions, such as along an X-axis and a Y-axis. The adhesive support assembly may include a first member 710 and a second member 720 that may be configured to move with respect to the first member 710.

In some embodiments, the adhesive application system 700 may apply adhesive 742 along three edges of the packaging material 740. Other embodiments may apply adhesive along less than three edges of the packaging material 740.

The first conveyor may continuously convey the packaging material 740 while the adhesive 742 is being applied to the packaging material 740, so as to reduce time consumed during application and to increase system throughput. Dynamic movement of the adhesive support assembly allows for application of adhesive 742 during movement of the packaging material 740 and an item on top of the packaging material 740.

After adhesive application, the packaging material 740 may be folded at a folding portion 750 of the system, and the roll-formed container may be output from the system at a downstream conveyor 760.

The applicator support assembly of the adhesive application system 700 is depicted in isolated view in FIG. 7B. The second member 720 of the applicator support assembly may be disposed transverse to the first member 710, and may be configured to move with respect to the first member 710. The applicator support assembly may include a bracket 732 that is coupled to the second member 720, and may be configured to slide along the second member 720. The adhesive applicator 730 may be coupled to the bracket 732. The adhesive application system may include a first actuator configured to cause the second member 720 to move with respect to the first member 710, and a second actuator configured to cause the bracket 732 to slide along the second member 720. Other embodiments may include additional or fewer actuators.

In FIG. 7B, a sheet of packaging material 740 is depicted in a top view after scoring is complete and adhesive is applied. The sheet of packaging material 740 may be connected to a roll of packaging material. The sheet of packaging material may have a fixed width and variable length, as determined by an amount of material unrolled from the roll of packaging material. The packaging material may be an unpadded material, such as single-sided corrugate. Other embodiments may have different non-Gaussian materials. In some embodiments, the packaging material may be heated to increase compliance.

In some embodiments, the adhesive application system 700 may apply adhesive 742 along three edges of the packaging material 740. Other embodiments may apply adhesive along less than three edges of the packaging material 740.

A number of crease lines or patterns may be formed on an upper surface of the sheet of packaging material 740. For example, a first set of crease lines 744 and a second set of crease lines may be formed on the upper surface of the packaging material 740. The first set of crease lines 744 and the second set of crease lines may be separated by a distance that is equal to or slightly greater than a width of the item to be packed in the container. The first set of crease lines 744 may include one or more crease lines formed, for example, using one or more rollers. In some embodiments, the first set of crease lines 744 and/or the second set of crease lines may include a single line (e.g., so as to form a flat package, etc.), whereas in other embodiments, the first set of crease lines 744 and/or the second set of crease lines may include more than one line, so as to form sidewalls of a container. In some embodiments, the first set of crease lines 744 may include transverse crease lines, such as in the illustrated embodiment, where the transverse crease lines can form a pattern that may increase flexibility of the sidewalls of the package. For example, the first set of crease lines 744 may include a first parallel crease line, and a second parallel crease line, where the separation between the first parallel crease line and the second parallel crease line may correspond to a height of the item to be packed (e.g., the separation may be equal to or greater than the height of the item, etc.). Transverse lines 746 may be used to form patterns, such as the Y-shaped pattern depicted in FIG. 4 (e.g., a crow's foot pattern, etc.). Similarly, the second set of crease lines may include transverse crease lines, such as in the illustrated embodiment, where the transverse crease lines can form a pattern that may increase flexibility of the sidewalls of the package. In some embodiments, the first set of crease lines 744 and the second set of crease lines may have the same dimensions, patterns, and so forth, whereas in other embodiments, the first set of crease lines 744 and the second set of crease lines may have different dimensions, patterns, and so forth, so as to accommodate items of different shapes and geometries, such as wedge-shaped items. The transverse lines 746 may be formed by the rolling dies discussed with respect to FIGS. 6A-6B, and may form a Y-shaped crease pattern. As depicted in FIG. 7B, at least a portion of the Y-shaped pattern may extend over one or both lines of first pair of crease lines 744 without impacting the ability to form roll-formed containers, and without negatively impacting structural integrity of the roll-formed package. In some embodiments, the Y-shaped or other crease pattern is formed on the packaging material 740 at least two times by the first rolling die, and at least two times by the second rolling die, for a total of four instances of the pattern, such as at opposite ends of the packaging material 740, as depicted in FIG. 7B.

Accordingly, the item for packing may be measured using one or more depth sensing sensors. A length of packaging material for packing the item may be determined and unrolled. The sheet of packaging material 740 may be creased by adjustable rolling rolling dies (e.g., the rolling dies may be separated to separate the distance between the first set of crease lines 744 and the second set of crease lines, and/or to separate the distance between individual crease lines of the first set of crease lines 744, etc.). To impart the crease lines, one or more computer systems in communication with the item packing system may be configured to cause, using a set of one or more rollers, a first Y-shaped crease pattern to be formed adjacent to the first crease line on the surface of the packaging material 740, and cause, using the same set or a different set of one or more rollers, a second Y-shaped crease pattern to be formed adjacent to the second crease line on the surface of the packaging material 740.

After the crease lines are formed, the adhesive 742 may be applied during an adhesive application process 470. The adhesive may be applied as a hot melt glue that is sprayed, beaded, or otherwise applied along one or more sides of the sheet of the packaging material 740. For example, the adhesive 742 may be applied along sides of the sheet of packaging material 740 to form a C-pattern.

Accordingly, the system may produce a roll-formed container for an item. The container may include an optionally rectangular sheet of packaging material having a first end and a second end, where the rectangular sheet includes a first pair of crease lines extending from the first end to the second end, a second pair of crease lines extending from the first end to the second end, a first crease pattern disposed between the first pair of crease lines adjacent to the first end, a second crease pattern disposed between the first pair of crease lines adjacent to the second end, a third crease pattern disposed between the second pair of crease lines adjacent to the first end, and a fourth crease pattern disposed between the second pair of crease lines adjacent to the second end. In some embodiments, adhesive may be disposed along no more than three edges of the packaging material. The first crease pattern, the second crease pattern, the third crease pattern, and/or the fourth crease pattern may be a Y-shaped pattern. Other embodiments may have different patterns and/or inconsistent patterns across the different ends. In some embodiments, at least a portion of the Y-shaped pattern or other pattern may extend over one or more lines of the respective first pair of crease lines and the second pair of crease lines. The container may have inward-facing gussets to increase a thickness of the container. The packaging material may be a single-sided corrugate cardboard material. The adhesive may be applied in discrete segments along edges of the packaging material.

Figure 7C:
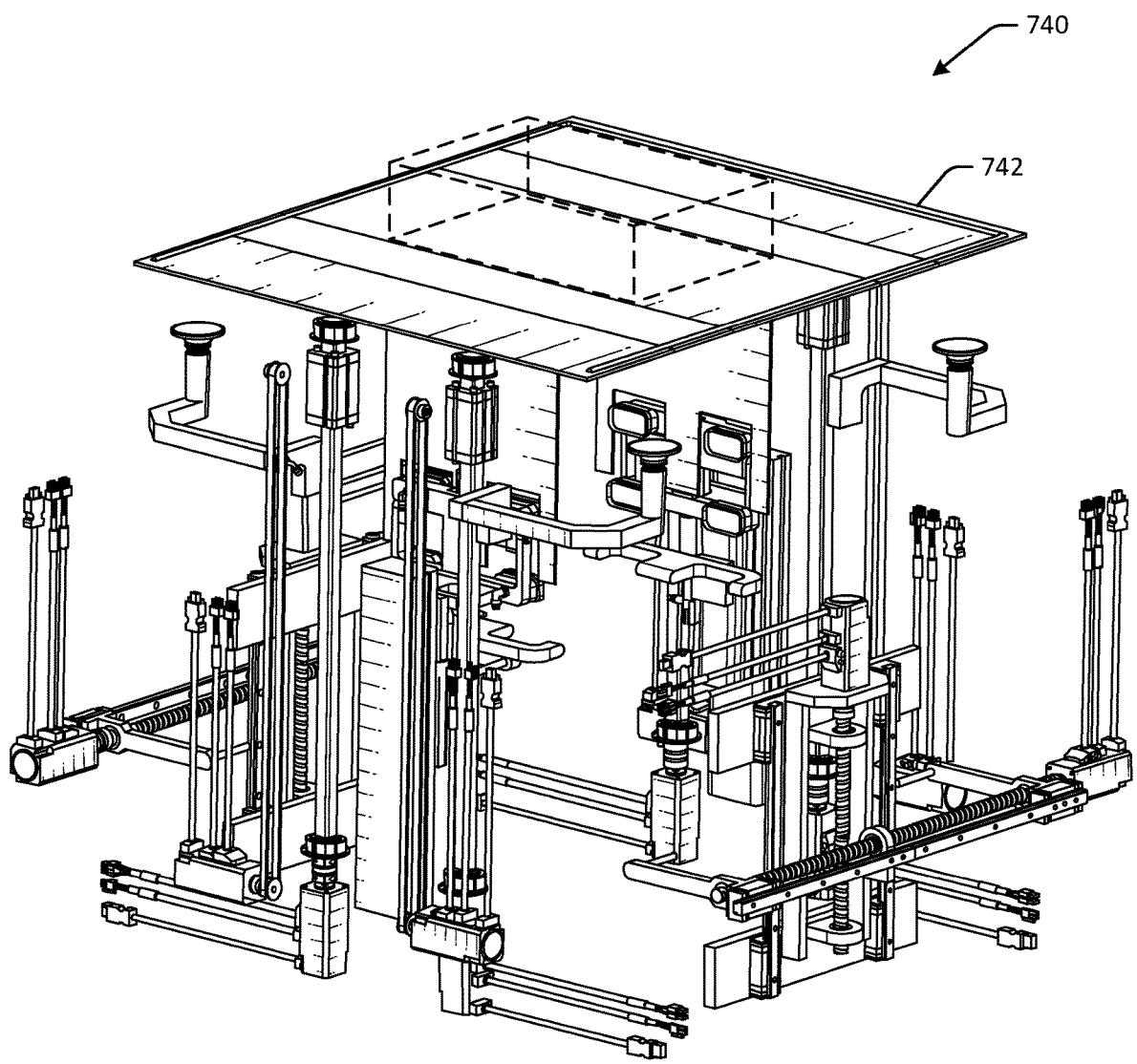
Figure 7D:
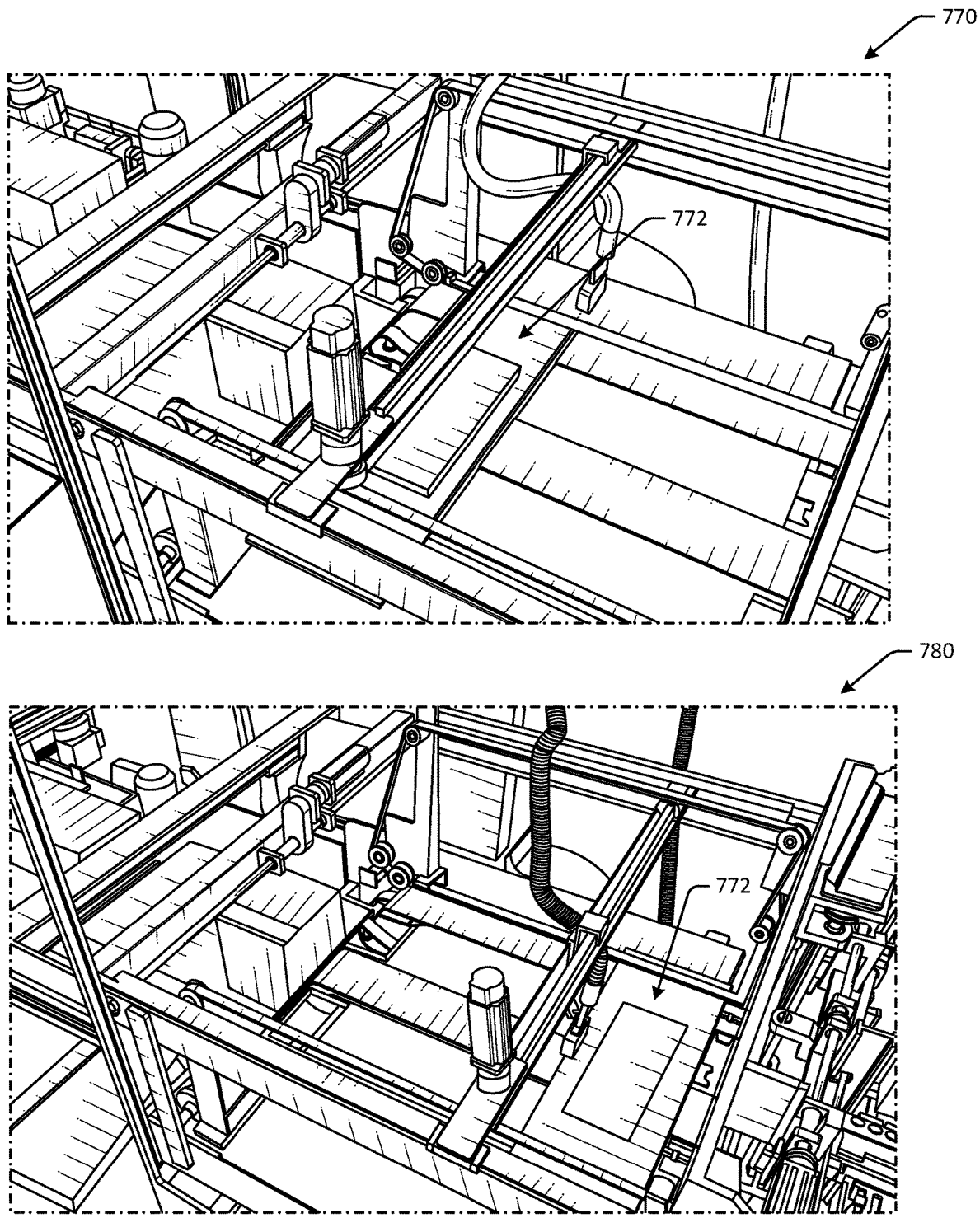

As depicted in FIGS. 7C and 7D, after adhesive 742 is applied, the packaging material 740 may be conveyed to a folding assembly such as that depicted in the isolated view of FIG. 7C. A label may be applied to a lower surface of the sheet of packaging material 740. The label may include destination information for the package. Some embodiments may not include adhesive. For example, a heat sealable material may be heat sealed instead of using adhesive, or a different material may be sewn, and so forth.

In FIG. 7D, the adhesive application process is depicted as part of the roll-formed container generation system. At a first instance 770, adhesive may begin to be applied while packaging material 772 is at a first location on a conveyor, and at a second instance 780, application of the adhesive may be complete by the time the packaging material 772 is at a second location downstream of the first location on the conveyor. For example, the system may include a second conveyor configured to convey an item onto the packaging material 772, where the item is conveyed with the packaging material 772 while the adhesive is being applied to the packaging material 772. The item may be unsecured while the adhesive is being applied to the packaging material 740, 772. For example, the item may not be actively controlled or handled, or touched by external components, during the adhesive application process.

Figure 8A:
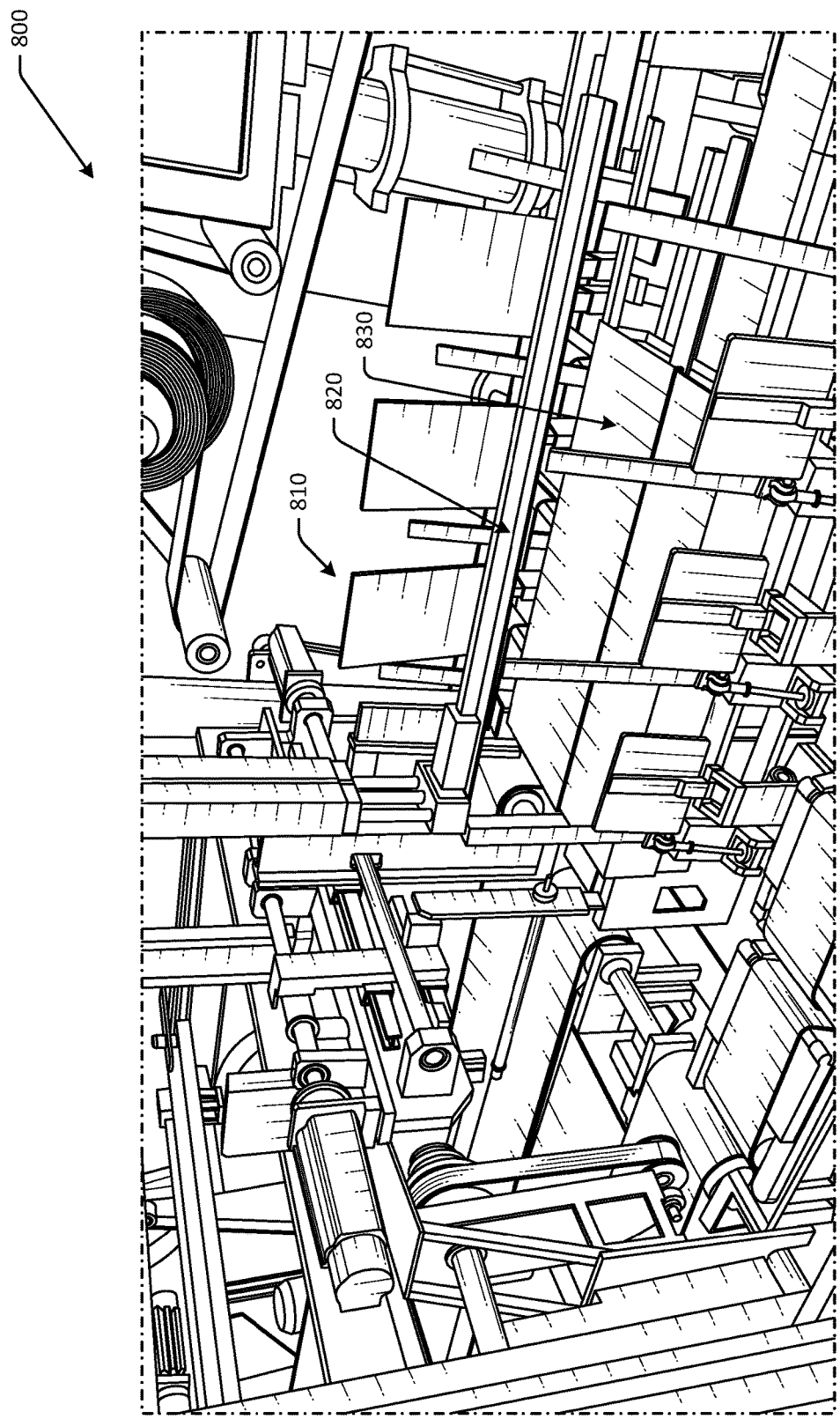
FIGS. 8A-8B are schematic illustrations of various container folding components of a roll-formed container generation system in accordance with one or more embodiments of the disclosure.
Figure 8B:
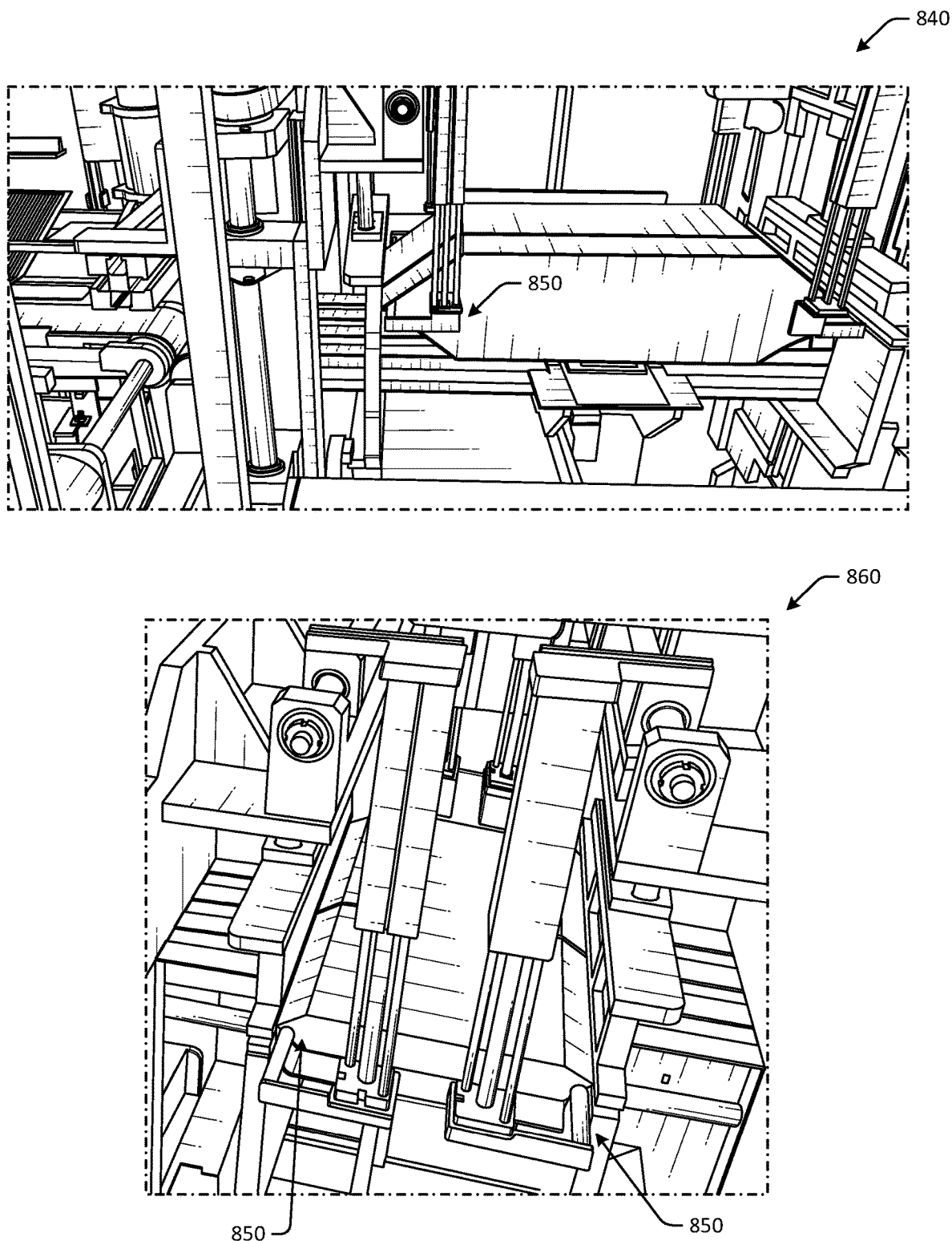

FIGS. 8A-8B are schematic illustrations of various container folding components of a roll-formed container generation system in accordance with one or more embodiments of the disclosure. Other embodiments may include additional or fewer components. The illustrations of FIGS.

8A-8B may not be to scale, and may not be illustrated to scale with respect to other figures. The components illustrated in FIGS. 8A-8B may be the same as some of the components discussed with respect to FIGS. 1-7D.

In FIG. 8A, a roll-formed container generation system 800 is depicted having one or more folder components 810 configured to fold packaging material 830 around an item. The system may include one or more compress bars 820 configured to apply pressure to an external surface of the packaging material 830 after the packaging material 830 is folded around an item. The compress bar 820 may be a cantilevered bar disposed on a side of the system 800. In some embodiments, the compress bar 820 may move vertically upwards and downwards, and may apply pressure to the packaging material 830 to increase strength of an adhesive bond that is formed. In FIG. 8B, a portion 840 of the system 800 is depicted in side view and in close-up view 860 with one or more pins 850 or other types of supports that can be used to prevent crushing of ends of the roll-formed package during sealing. For example, the system may include a set of pins 850 configured to be create inward-facing gussets at ends of the roll-formed container, where the set of pins is configured to move laterally towards and away from the packaging material.

One or more operations of the methods, process flows, or use cases of FIGS. 1-8B may have been described above as being performed by a user device, or more specifically, by one or more program module(s), applications, or the like executing on a device. It should be appreciated, however, that any of the operations of the methods, process flows, or use cases of FIGS. 1-8B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8B may be described in the context of the illustrative devices, it should be appreciated that such operations may be implemented in connection with numerous other device configurations.

The operations described and depicted in the illustrative methods, process flows, and use cases of FIGS. 1-8B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
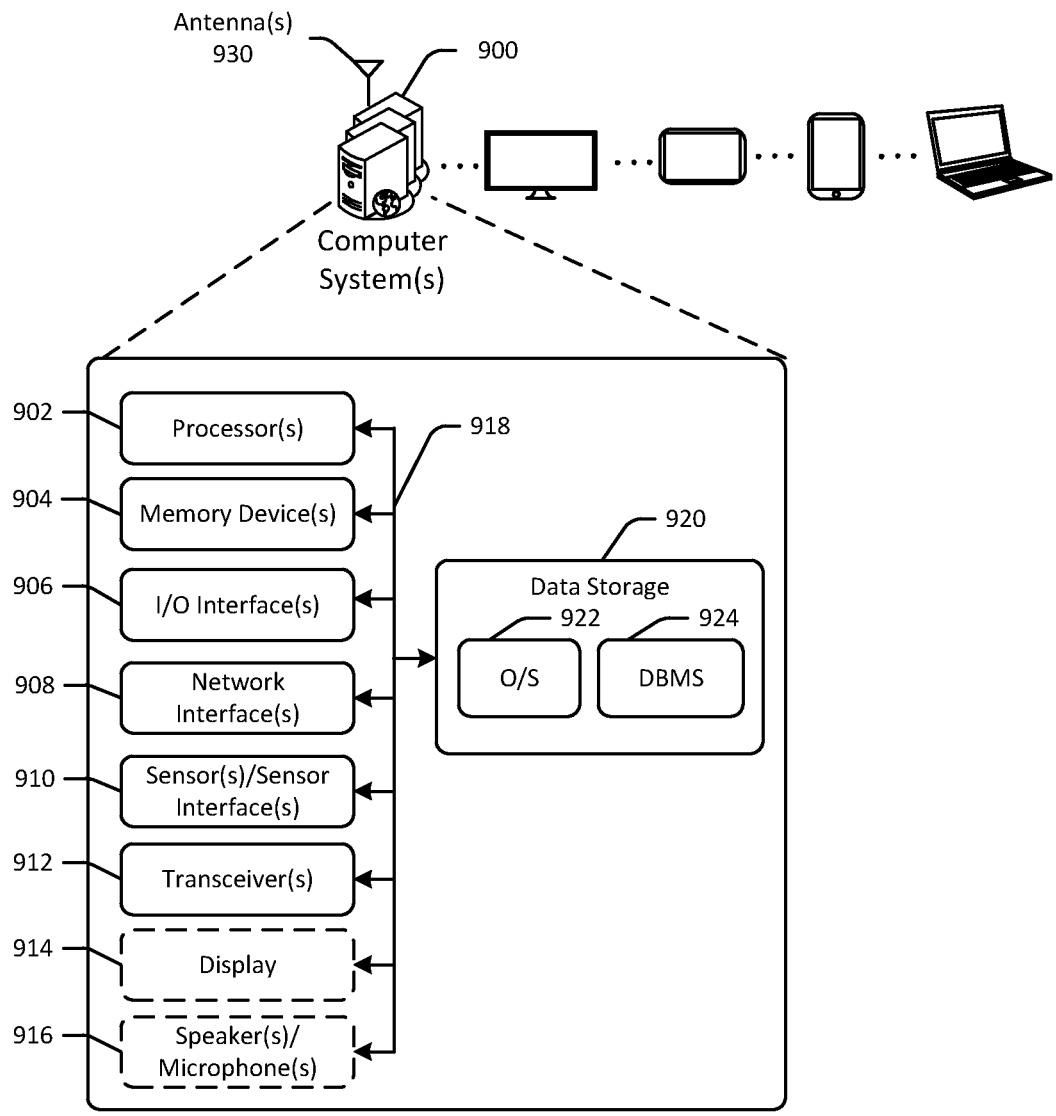
FIG. 9 schematically illustrates an example architecture of a computer system associated with a custom sized roll-formed container generation system in accordance with one or more embodiments of the disclosure.

FIG. 9 is a schematic block diagram of one or more illustrative computer system(s) 900 associated with a roll-formed container generation system in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for the controller(s) of FIGS. 1-8BB. For example, the computer system(s) 900 may be a controller and may control one or more aspects of the roll-formed container generation systems described in FIGS. 1-8BB.

The computer system(s) 900 may be configured to communicate with one or more servers, user devices, or the like. The computer system(s) 900 may be configured to control operation of one or more components of the roll-formed container generation systems, such as determining distances between rolling dies, causing creasing wheels to move to various lateral positions, and so forth.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 930 may include any suitable type of antenna depending, for example, on the communications protocols used to transmit or receive signals via the antenna(s) 930. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 930 may be communicatively coupled to one or more transceivers 912 or radio components to which or from which signals may be transmitted or received.

As previously described, the antenna(s) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 930 may be configured to transmit or receive radio frequency signals within any suitable frequency range forming part of the unlicensed portion of the radio spectrum.

The antenna(s) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 930—transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving—potentially in cooperation with any of antenna(s) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms.

The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item packing station comprising:
   a first conveyor configured to transport an item for packing;
   a second conveyor configured to transport packaging material, wherein the second conveyor is disposed adjacent to the first conveyor and both the first conveyor and the second conveyor move at substantially the same speed;
   an end scoring device comprising:
      a first rolling die comprising a crease pattern;
      a first arm coupled to the first rolling die;
      a second rolling die comprising the crease pattern;
      a second arm coupled to the second rolling die; and
      a first support member configured to support the first arm and the second arm, wherein the first arm and the second arm are configured to: (i) slide along the first support member, such that a distance between the first rolling die and the second rolling die is adjusted, and (ii) rotate about the first support member from a first position to a second position, such that the first rolling die and the second rolling die move from the first position to the second position;
      wherein the end scoring device is configured to score a first end and a second end of the packaging material with the crease pattern; and
   a longitudinal scoring device configured to score longitudinal lines on the packaging material, the second scoring device comprising:
      a second support member; and
      a first scoring assembly comprising:
         a first base configured to slide along the second support member, such that the first scoring assembly moves from a third position to a fourth position;
         a first creasing wheel;
         a third arm coupled to the first creasing wheel and the first base;
         a second creasing wheel; and
         a fourth arm coupled to the second creasing wheel and the first base;
         wherein the third arm is configured to slide along the first base, such that a distance between the first creasing wheel and the second creasing wheel is adjusted, and wherein the third arm and the fourth arm are configured to rotate about the second support member;
         wherein the first scoring assembly is configured to score a first pair of linear lines along the packaging material.

2. The item packing station of claim 1, wherein the longitudinal scoring device further comprises:
   a second scoring assembly coupled to the second support member, the second scoring assembly comprising:
      a second base configured to slide along the second support member;
      a third creasing wheel;
      a fifth arm coupled to the third creasing wheel and the second base;
      a fourth creasing wheel; and
      a sixth arm coupled to the fourth creasing wheel and the second base;
      wherein the fifth arm is configured to slide along the second base, such that a distance between the third creasing wheel and the fourth creasing wheel is adjusted, and wherein the fifth arm and the sixth arm are configured to rotate about the second support member;
      wherein the second scoring assembly is configured to score a second pair of linear lines along the packaging material.

3. The item packing station of claim 1, wherein the crease pattern forms a Y-shaped pattern that is formed between the first pair of crease lines, and at least a portion of the Y-shaped pattern extends over each line of first pair of crease lines.

4. The item packing station of claim 1, wherein rotation of the first rolling die and the second rolling die is paused for at least a portion of time when the first creasing wheel, the second creasing wheel, the third creasing wheel, and the fourth creasing wheel are simultaneously scoring the packaging material.

5. A system to produce a roll-formed container, the system comprising:
- a first scoring device configured to score a packaging material, the first scoring device comprising:
  - a first rolling die comprising a crease pattern;
  - a first arm coupled to the first rolling die;
  - a second rolling die comprising the crease pattern;
  - a second arm coupled to the second rolling die; and
  - a first support member configured to support the first arm and the second arm, wherein the first arm and the second arm are configured to: (i) slide along the first support member, such that a distance between the first rolling die and the second rolling die is adjusted, and (ii) rotate about the first support member from a first position to a second position, such that the first rolling die and the second rolling die move from the first position to the second position;
  wherein the first scoring device is configured to score a first end and a second end of the packaging material with the crease pattern.

6. The system of claim 5, further comprising:
a second scoring device configured to score the packaging material, the second scoring device comprising:
- a second support member; and
- a first scoring assembly comprising:
  - a first base configured to slide along the second support member, such that the first scoring assembly moves from a third position to a fourth position;
  - a first creasing wheel;
  - a third arm coupled to the first creasing wheel and the first base;
  - a second creasing wheel; and
  - a fourth arm coupled to the second creasing wheel and the first base;
  wherein the third arm is configured to slide along the first base, such that a distance between the first creasing wheel and the second creasing wheel is adjusted, and wherein the third arm and the fourth arm are configured to rotate about the second support member;
wherein the first scoring assembly is configured to score a first pair of linear lines along the packaging material.

7. The system of claim 6, wherein the second scoring device further comprises:
- a second scoring assembly coupled to the second support member, the second scoring assembly comprising:
  - a second base configured to slide along the second support member;
  - a third creasing wheel;
  - a fifth arm coupled to the third creasing wheel and the second base;
  - a fourth creasing wheel; and
  - a sixth arm coupled to the fourth creasing wheel and the second base;
  wherein the fifth arm is configured to slide along the second base, such that a distance between the third creasing wheel and the fourth creasing wheel is adjusted, and wherein the fifth arm and the sixth arm are configured to rotate about the second support member;
wherein the second scoring assembly is configured to score a second pair of linear lines along the packaging material.

8. The system of claim 7, wherein rotation of the first rolling die and the second rolling die is paused for at least a portion of time when the first creasing wheel, the second creasing wheel, the third creasing wheel, and the fourth creasing wheel are simultaneously scoring the packaging material.

9. The system of claim 6, wherein the crease pattern is formed between the first pair of crease lines.

10. The system of claim 9, wherein the crease pattern comprises a Y-shaped pattern, and at least a portion of the Y-shaped pattern extends over each line of first pair of crease lines.

11. The system of claim 5, wherein the crease pattern is formed on the packaging material at least two times by the first rolling die, and at least two times by the second rolling die.

12. The system of claim 5, wherein the first scoring device further comprises:
a first actuator configured to cause both the first rolling die and the second rolling die to rotate with respect to the first support member.

13. The system of claim 12, wherein the first scoring device further comprises:
a second actuator configured to cause the first arm and the second arm to rotate from the first position to the second position; and
a third actuator configured to cause the first arm and the second arm to slide along the first support member.

14. The system of claim 5, wherein the first scoring device further comprises:
a second support member coupled to the first arm and the second arm, wherein rotation of the second support member imparts rotational motion to the first arm and the second arm.

15. The system of claim 5, wherein the packaging material is a roll-formed and at least partially fiber-based material.

* * * * *